United States Patent [19]

Nakamura et al.

[11] Patent Number: 5,557,443
[45] Date of Patent: Sep. 17, 1996

[54] OPTICAL COMMUNICATION METHOD AND OPTICAL REMOTE CONTROLLER

[75] Inventors: Hiroshi Nakamura, Kasuga; Yasuaki Muranaka, Chikushi-gun; Susumu Ishibashi, Fukuoka; Toshiyuki Kihara, Tosu, all of Japan

[73] Assignee: Matsushita Electric Industrial Co., Ltd., Osaka, Japan

[21] Appl. No.: 341,217

[22] Filed: Dec. 5, 1994

[30] Foreign Application Priority Data

Dec. 9, 1993 [JP] Japan .................................. 5-309011
Jun. 23, 1994 [JP] Japan .................................. 6-141699

[51] Int. Cl.$^6$ .......................... H04B 10/00; H04N 5/225; H04N 5/232
[52] U.S. Cl. .......................... 359/142; 359/146; 359/148; 359/155; 348/169; 348/211
[58] Field of Search .................................. 359/155, 159, 359/172, 142, 143, 144, 145, 146, 148; 348/211, 212, 213, 214, 169, 373; 250/208.2, 231.16, 234

[56] References Cited

U.S. PATENT DOCUMENTS

| | | | |
|---|---|---|---|
| 4,864,651 | 9/1989 | Ogiwara et al. | 359/161 |
| 5,073,824 | 12/1991 | Vertin | 348/211 |
| 5,091,781 | 2/1992 | An | 348/169 |
| 5,223,875 | 6/1993 | Yanagisawa | 348/169 |
| 5,389,967 | 2/1995 | Kim | 348/169 |

FOREIGN PATENT DOCUMENTS 3-62637A 3/1991 Japan .
4-149532A 5/1992 Japan .
5-34812A 2/1993 Japan .

*Primary Examiner*—Leo Boudreau
*Assistant Examiner*—Bhavesh Mehta
*Attorney, Agent, or Firm*—Watson Cole Stevens Davis, P.L.L.C.

[57] ABSTRACT

An optical remote controller includes a movable infrared ray transmitter, a plurality of light receiving modules, and a received light signal selector for selecting the earliest sensed one from the light signals received by the light receiving modules. The signal selector includes a clock signal generator, first to third mask signal generators to generate invalidation signals, received light signal mask circuits to invalidate received signals, a mask release signal generator to measure an invalidation time period, and an encoder to sense termination of each unit of transmission information. A camera is attached rotatably in vertical and horizontal directions on a fixed support plate. The support plate includes a plurality of infrared ray receiving elements. According to a moving command of an optical remote control signal received by the elements, an optical remote controller vertically and horizontally drives the camera and directs the camera to the arrival direction of the remote control signal.

17 Claims, 16 Drawing Sheets

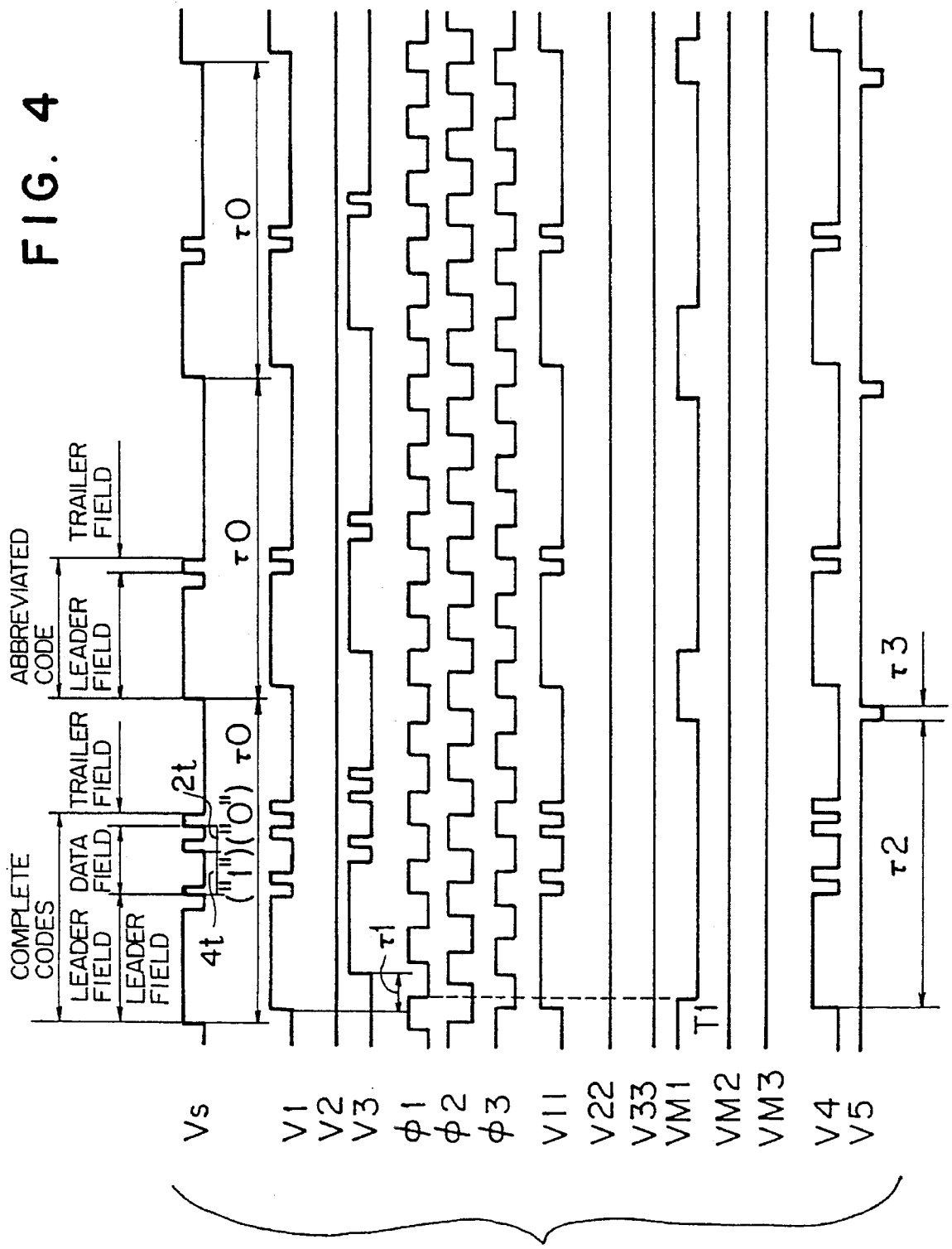

FIG. 5A
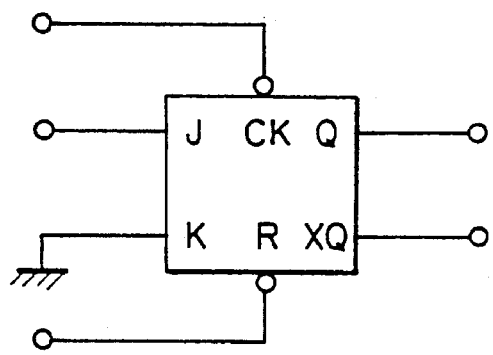
FIG. 5B
| R | CK | J | XQ |
|---|---|---|---|
| L | X | X | H |
| H | ⁻⌐_ | L | UNCHANGED |
| H | ⁻⌐_ | H | L |
| H | _⌐⁻ | X | UNCHANGED |
| H | H | X | UNCHANGED |
| H | L | X | UNCHANGED |
FIG. 5C
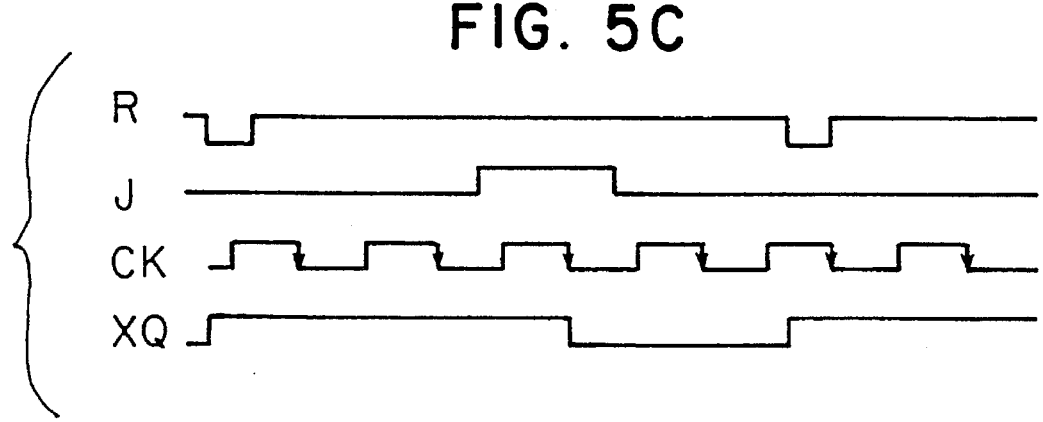

OPTICAL COMMUNICATION METHOD AND OPTICAL REMOTE CONTROLLER

BACKGROUND OF THE INVENTION

1. Field of the Invention

The present invention relates to an optical communication method and an optical remote controller using the same in which infrared rays are employed to remotely control an electric appliance for family use, a television conference, or the like.

2. Description of the Related Art

Recently, optical remote controllers using infrared rays have been broadly applied to various fields as infrared ray remote controllers for such apparatuses as a television, an audio system, and an air conditioner.

Description will be given of an optical remote controller of the prior art. For example, according to a first conventional example described in JP-A-3-62637, there has been proposed a communication method using a micro computer which handles a plurality of receiving sections to select therefrom a receiving section operating in a favorable communication state.

FIG. 18 shows in a block diagram the configuration of an optical remote controller in the first conventional example. A reference numeral 501 indicates a light emitting section of the controller. The section 501 moves, for example, in a direction from a point A to a point B as denoted by an arrow mark in the diagram. A numeral 502 designates a main section of the controller furnished with a micro computer 503 and first to fourth light receiver sections 504 to 507.

Operation of the first conventional example will be next described. In operation, when the light emitting section 501 is at a position A, the main section 502 selects the first light receiving section 504 for communications. In this situation, when the section 501 is moved to a position B, the first light receiving section 504 is beyond a zone or range to receive infrared rays from the light emitting section 501. Consequently, a communication error will be detected or the number of errors detected by a data check using parity bits or the like will be increased. To overcome this difficulty, the micro computer 503 selects the second light receiving section 505 for communications. When another communication error occurs or a predetermined error rate is exceeded in data communications, the micro computer 503 automatically and sequentially selects another light receiving section until communication is desirably achieved. With the light emitting section 501 set to the position B, when it is assumed that a favorable communication state is obtained for the third light receiving section 506 selected as above, the apparatus uses the section 506 for the subsequent communications. However, when a communication error is again detected, the fourth light receiving section 507 is selected for further communications.

In a second conventional example described, for example, in JP-A-5-34812, a plurality of light receiving sections are arranged such that the camera direction is controlled in association therewith.

FIG. 19 is a front view of an optical remote controller in the second conventional example. In this construction, a camera 601 is fixedly disposed on a camera setting section 602, which is attached on a supporting plate 605 of a tripod 603. The camera setting section 602 rotatably moves in the vertical and horizontal directions to control the direction of the camera 601. The section 602 includes light receiving sections 604a to 604e.

FIG. 20 is a block diagram showing the structure of a control section of the optical remote controller according to the second conventional example. Signals transmitted from a light emitting section 606 are received by the light receiving sections 604a to 604e. A judge section 607 checks intensity of the received light and then an instruction value calculating section 608 accordingly issues to a motor driver 609 an instruction to drive a motor 610. As a result, the driver 609 drives the motor 610 to actuate the camera setting section 602.

In the optical remote controllers respectively of the first and second conventional examples, the sensing precision with respect to the direction of a subject is, for example, about five degrees (5°).

However, the first conventional example is attended with a problem that after an occurrence of a communication error, data cannot be attained until it is decided there is another light receiving section suitable for communications. Furthermore, after the light emitting section 501 is moved, the light receiving sections 504 to 507 used up to this point in time are beyond the zone to appropriately receive infrared rays from the light emitting section 501, which increases a probability of occurrence of communication errors. Consequently, the communication data is required to include check data such as parity bits.

In addition, according to the second conventional example, the light receiving sections 604a to 604e also move together with the camera 601 and the camera setting section 602. This restricts detecting directions of light rays of the light receiving sections. To expand the zone or range of detecting the direction of light rays, there have been disadvantageously required a large number of light receiving elements.

As for the operational requirements, for the reason described above, the signals are required to be continuously emitted from the light emitting section during the sequence of operations until the light receiving sections are oriented toward the direction of the light emitting section.

SUMMARY OF THE INVENTION

It is therefore an object of the present invention to provide an optical communication method capable of solving occurrence of communication errors even when the light emitting section is moved.

Another object of the present invention is to provide a highly reliable optical remote controller employing an optical communication method capable of receiving by a simple operation light signals illuminated from a light emitting section moving in a wide range.

To achieve the above objects, there are provided according to the present invention an optical communication method and an optical remote controller including at least one movable light emitting section, a plurality of light receiving sections for receiving light from the light emitting section, camera driving means for supporting and rotating the camera to face a predetermined direction, fixing section which holds and accommodates therein the camera driving means and in which the plural light receiving sections are arranged, received light signal selecting means connected to the plural light receiving sections for examining a plurality of received light signals and selecting and outputting therefrom a light signal first sensed, invalidation signal generating means for monitoring a plurality of received light signals and generating, when either one of the plural light receiving sections outputs a received light signal, an invalidation signal to invalidate received light signals from the light receiving sections which do not output a received light signal, received light signal invalidating means connected to the invalidation signal generating means for invalidating received light signals from the light receiving sections which do not output a received light signal, received light signal incident direction sense means connected to the plural light receiving sections for sensing and outputting an arrival or incident direction of the received light signal on the basis of a combination of a plurality of received light signals, shooting direction and view angle setting means for beforehand setting a camera direction and an optimal angle of view in association with the number and positions of light receiving sections, and control means for conducting a predetermined rotation control for the camera driving means on the basis of the selection output from the received light signal selecting means or the sense output from the received light signal incident direction sense means.

In the above configuration, the received light signal invalidating means validates received light signals from any light receiving sections in the initial state and the invalidation signal generating means monitors each of the received light signals received via the received signal invalidating means from the plural light receiving sections. When a light signal illuminated from the light emitting section enters one of or several ones of the plural light receiving sections, the invalidation signal generating means detects a received light signal first received and outputs therefrom an invalidation signal to invalidate the second and subsequent received light signals. Since the received light signal invalidating means invalidates the second and subsequent received light signals in response to the invalidation signal, the received light signal selecting means selects and outputs only one received light signal first sensed.

Moreover, since the light receiving sections are fixedly arranged regardless of the camera direction, the light reception can be conducted in a wide range with a small number of light receiving elements and the camera direction can be controlled in a broad range. In addition, since an incident direction of light is detected on the basis of a received light signal thereof, it is unnecessary to carry out the control operation while changing a relative angle between a subject and the camera. That is, only a short period of time of receiving light is necessary to decide the light incident direction, namely, the direction of the subject. This consequently leads to a convenient camera operation and minimizes the motor driving period of time, thereby leading to elongation of the motor life.

Furthermore, the angle of view is automatically adjusted in the shooting operation according to the sense precision of the received light signal incident direction sense means so as to automatically locate the subject in the shooting range of the camera. This remarkably improves operability when automatically tracking the subject.

BRIEF DESCRIPTION OF THE DRAWINGS

These and other objects and advantages of the present invention will become apparent by reference to the following description and accompanying drawings wherein:

FIG. 4 is a signal timing chart showing operation of signals in the first embodiment;

FIG. 5A is a diagram showing JK flip-flop terminals of the first embodiment;

FIG. 5B is a table showing state transitions of the JK flip-flop;

FIG. 5C is a waveform diagram showing operation waveforms of the JK flip-flop;

DESCRIPTION OF THE PREFERRED EMBODIMENTS

Figure 1:
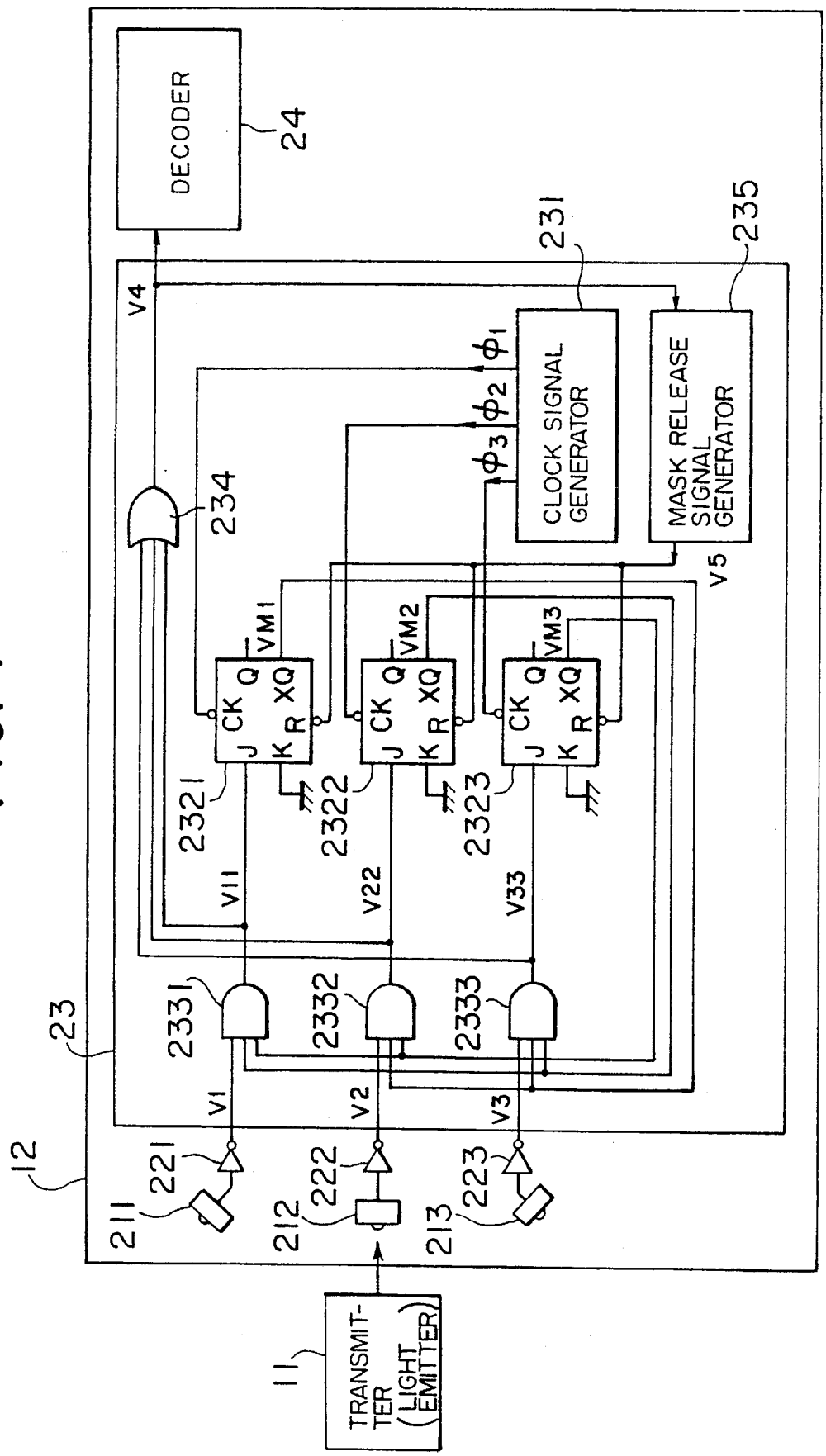
FIG. 1 is a block diagram showing the configuration of a first embodiment of an optical remote controller according to the present invention.

Referring now to the drawings, description will be given of embodiments of the optical communication method and the optical remote controller according to the present invention. A camera apparatus applied to a television conference system will be described by way of example. In the system, infrared rays are used for communications.

FIG. 1 is a block diagram showing a first embodiment of the optical remote controller according to the present invention. In the configuration, a reference numeral 11 indicates a signal transmitter to emit light and a numeral 12 designates a light receiver to receive a light signal from the transmitter 11. The light receiver 12 is constituted as follows. Numerals 211 to 213 respectively indicate first to third light receiving modules (sections) to receive infrared rays from the transmitter 11 so as to conduct a process such as an opto-electric conversion of the received rays, a signal amplification, or a signal detection, thereby outputting received light signals therefrom. Numerals 221 to 223 denote first to third waveform shaping gates to receive the signals respectively from the first to third light receiving modules 211 to 213 so as to output therefrom received signals V1 to V3, respectively. A numeral 23 designates a received light signal selecting circuit connected to the first to third waveform shaping gates 221 to 223 to resultantly output a received signal V4 therefrom. A numeral 24 indicates a decoding circuit connected to the signal selecting circuit 23 to extract from the signal V4 information sent from the transmitter 11.

The received signal selecting circuit 23 is constructed as follows. A reference numeral 231 is a clock signal generating circuit to output three clock signals φ1, φ2, and φ3 which respectively have different phases and which have an identical phase difference therebetween. Numerals 2321 to 2323 designate first to third mask signal generating circuits as invalidation signal generating means each including a JK flip-flop. The circuits 2321 to 2323 respectively sample signals V11, V22, and V33 in synchronism respectively with the clock signals φ1, φ2, and φ3 to produce mask signals VM1 to VM3, respectively. Numerals 2331 to 2333 denote first to third received signal mask circuits as received signal invalidating means each including a 3-input AND gate. The mask circuits 2331 to 2333 are respectively connected to the first to third waveform shaping gates 221 to 222 and the first to third mask signal generating circuits 2321 to 2323 to produce the signals V11 to V33. A reference numeral 234 indicates an OR gate which receives as inputs thereto the signals V11 to V33 to produce the received light signal V4. A numeral 235 designates a mask release signal generating circuit as invalidation period measuring means which receives as an input thereto the signal V4 to produce a mask release signal V5.

Figure 2:
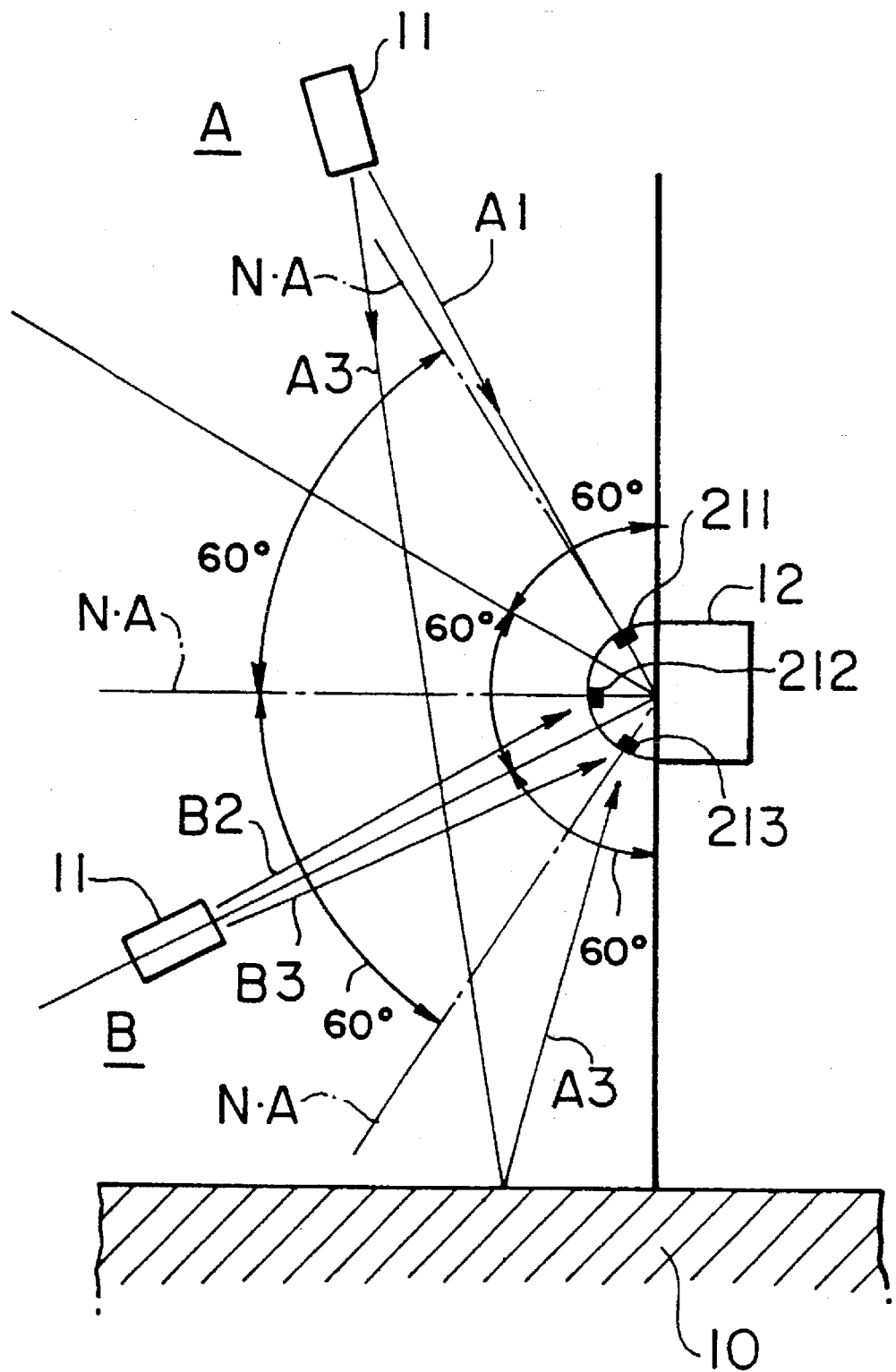
FIG. 2 is a diagram showing a light receiving module layout of the first embodiment.

Next, FIG. 2 shows a receiving module layout of the first embodiment of the optical remote controller. Referring to this diagram, description will be given of the layout of the first to third light receiving modules 211 to 213. Each of the modules 211 to 213 has a light receiving central axis N•A and a light receiving range of 60° centered on the axis N•A. These modules 211 to 213 are arranged radially along a circular line with an angular difference of 60° between the respective axes N•A. A numeral 10 indicates a wall of a room in which the optical communication apparatus is installed.

Subsequently, operation of the remote controller will be described. The transmitter 11 is assumed to be movable in this embodiment. Description will be given of operation of the controller when the transmitter 11 is moved from a position A to a position B in FIG. 2.

Figure 3A:
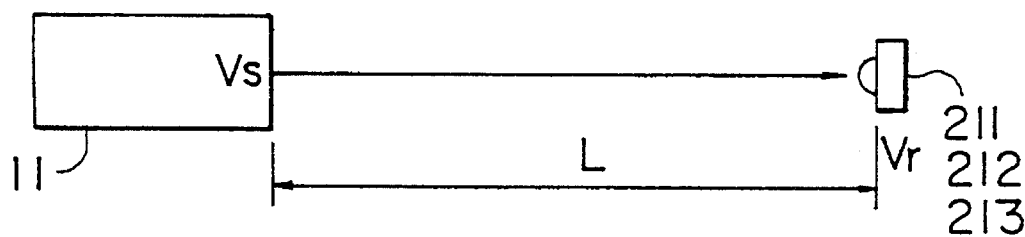
FIG. 3A is a diagram for explaining transmission signals and signals outputted from light receiving modules of the first embodiment.
Figure 3B:
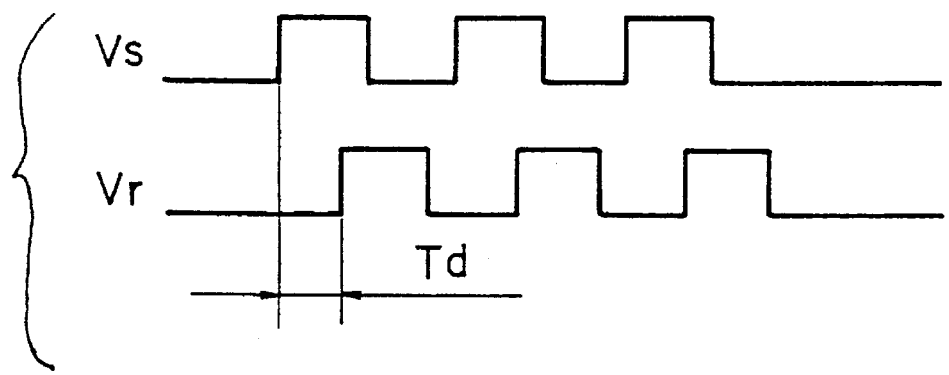
FIG. 3B is a signal timing chart showing signal delay time in the first embodiment.
Figure 3C:
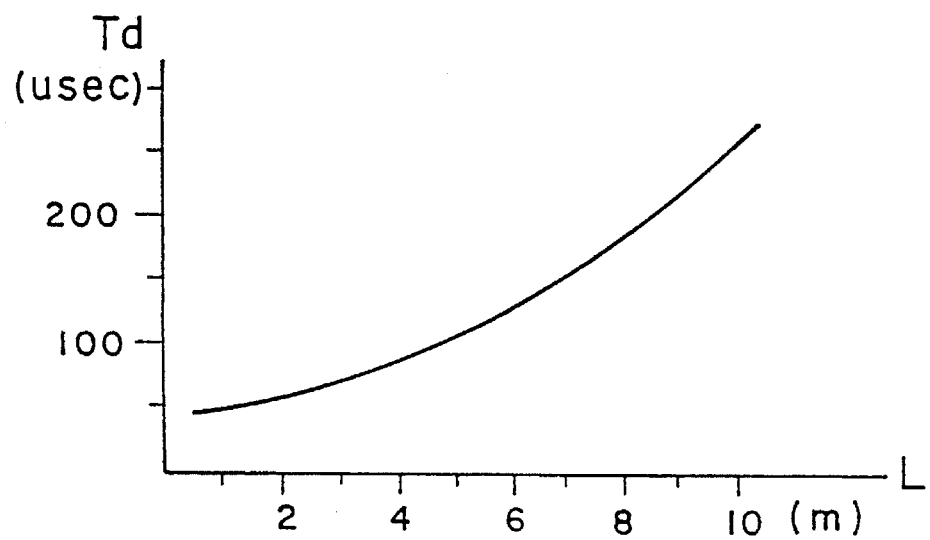
FIG. 3C is a graph showing a change in the delay time of signal in the first embodiment.

First, the output signal delay characteristic of the light receiving modules related to the difference of optical path lengths will be described by reference to FIGS. 3A to 3C. FIG. 3A is a diagram for explaining a transmission signal Vs and a signal Vr outputted from a light receiving module. FIG. 3B shows time of delay between the signals Vs and Vr, whereas FIG. 3C shows a change in the delay time. Assume the optical path length is L from the transmitter 11 to each of the first to third light receiving modules 211 to 213 as shown in FIG. 3A, and the delay time of the signal Vr relative to the signal Vs is Td as shown in FIG. 3B. In this situation, the change in the delay time Td with respect to the optical path length L is as shown in FIG. 3C. The longer the length L is, the longer the delay time Td is.

Next, description will be given of a general example of the waveform of the signal Vs produced from the transmitter 11. FIG. 4 is a signal timing chart showing operation of signals of the first embodiment. The transmission signal Vs includes packets as its units. A first packet includes complete codes of a leader field, a data field, and a trailer field. To repeatedly transmit the same data, each of the second and subsequent packets includes simplified or abbreviated codes in which the data field is missing. Each packet is transmitted with a fixed period of interval time τ0. In the data field of complete codes, transmission information is expressed according to a pulse position modulation (PPM). A waveform having a cycle of 4t or 2t represents data "1" or "0", respectively.

In FIG. 2, assume that when light is emitted from the transmitter 11 at the position A, a light signal propagating through an optical path A1 is received by the first light receiving module 211. Since the module 212 is beyond the light receiving range, the light is not received by the second light receiving module 212. The light signal which is reflected from the wall 10 and which propagates through a light path A3 is received by the third light receiving module 213. FIG. 4 shows waveforms of received light signals V1 to V3 respectively from the first to third waveform shaping gates 221 to 223 in this situation.

Due to the output signal delay characteristic of the first to third light receiving modules 211 to 213, the signal V3 is delayed in time by τ1 relative to the signal V1 according to the difference between the lengths of optical paths A1 and A3. The signal V2 is kept unchanged at a low (L) level.

Assume that the mask signals VM1 to VM3 respectively produced from the first to third mask signal generating circuits 2321 to 2323 are at a high (H) level and the mask is not effected in the initial state. Under this condition, the first received signal mask circuit 2331 outputs therefrom the signal V11 which is equivalent to the received signal V1 supplied thereto via the first waveform shaping gate 221.

Next, referring to FIGS. 5A to 5C, description will be given of operation of the JK flip-flop constituting each of the first to third mask signal generating circuits 2321 to 2323. FIG. 5A shows terminals of the JK flip-flop of the first embodiment of the optical communication apparatus according to the present invention. FIG. 5B is a state transition diagram of the JK flip-flop. FIG. 5C shows operational waveforms of signals of the JK flip-flop. In FIG. 5B, a letter X stands for "don't care". Since an input terminal K of the JK flip-flop is fixed to a low level as shown in FIG.

1, description will not be given of operation when a high-level signal is inputted to the terminal K.

In FIG. 5C, when an input terminal R (reset) is set to a low level, an output terminal XQ is raised to a high level. Thereafter, even when the terminal R is changed to a high level, the output terminal XQ keeps outputting a high-level signal. With an input terminal J set to a high level, when a clock input terminal CK is decreased from a high level to a low level, the output level of the output terminal XQ is altered to a low level. In a case where the input terminal J is at a low level, where the clock input terminal CK keeps the high or low level, or where the terminal CK is raised from a low level to a high level, the output level of the terminal XQ is kept unchanged.

In consequence, the first mask signal generating circuit 2321 samples, as shown in FIG. 4, the signal V11 at a point of time synchronized with the falling edge of the clock signal φ1. At T1, since the signal V11 is at a high level, the mask signal VM1 is driven to a low level. Consequently, the signals V22 and V23 respectively of the second and third received light signal mask circuits 2332 and 2333 receiving the mask signal VM1 are fixed to a low level. The received light signal V3 changed to a high level after the signal V1 is accordingly masked.

As a result, from the OR gate 234, there is outputted a received light signal V4 having a waveform similar to that of the previously received light signal V1. The signal is fed to the decoder 24 such that transmission information is extracted therefrom.

That is, in the first embodiment of the optical remote controller, there is selected a received light signal generated in association with a light signal received via the shortest optical path by the first light receiving module 211, thereby supplying the signal V1 to the decoder 24. Since the signal V1 is attended with the least disturbance in the waveform due to attenuation and reflection, the pulse width thereof is most analogous to the original pulse width of the signal Vs sent from the transmitter 11. Namely, the signal V1 is most suitable for the decoding process.

The mask release signal generator 235 sets, when a period of time τ2 lapses from the rising edge of the signal V4, the mask release signal V5 to a low level and then keeps the low level for a period of time τ3 (τ0>τ2+τ3). In response to the signal V5, the JK flip-flop of the first mask signal generator 2321 is reset, the mask signal VM1 is altered to a high level, and the masking is released for the signals V22 and V33.

Subsequently, assume in the diagram of FIG. 2 that the transmitter 11 is moved to the position B. Since the module 211 is beyond the light receiving zone, light emitted therefrom is not received by the first light receiving module 211. Light signals respectively propagated through optical paths B2 and B3 are received by the second and third light receiving modules 212 and 213, respectively. The optical paths B2 and B3 are assumed to be equal to each other.

Operation of the optical remote controller in this situation will be described by reference to the signal timing chart of the first embodiment of the optical communication apparatus shown in FIG. 6. In the initial state according to this chart, in response to the mask release signal V5 outputted from the mask release signal generator 235, the mask signals VM1 to VM3 respectively produced from the first to third mask signal generators 2321 to 2123 are set to a high level. Namely, the masking is not effected.

Figure 6:
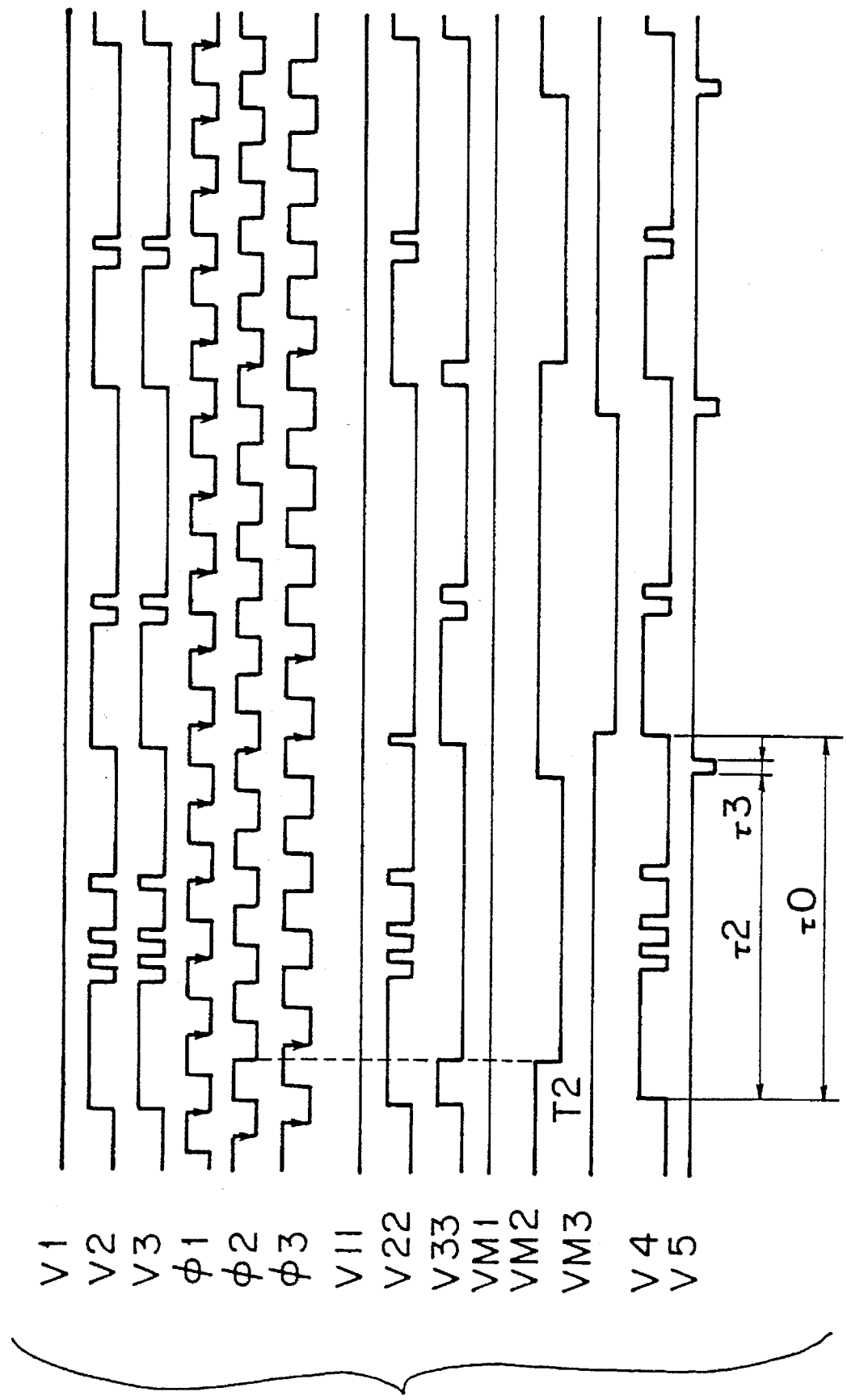
FIG. 6 is a signal timing chart of the first embodiment.

When infrared ray signals arrives at the second and third light receiving modules 212 and 213, the waveforms of the received light signals respectively from the first to third waveform shaping gates 221 to 223 become as shown in FIG. 6. Since the optical paths B2 and B3 have substantially the same optical path length, the signals V2 and V3 change the states thereof almost at the same time. The signal V1 is kept at the low level. In this situation, the second and third received light signal mask circuits 2332 and 2333 respectively outputs signals V22 and V33 which are respectively equivalent to the signals V2 and V3 respectively supplied from the second and third waveform shaping gates 222 and 223.

However, the second and third received light signal mask circuits 2332 and 2333 respectively sample the signals V22 and V33 at points of time respectively synchronized with the falling edges of the clock signals φ2 and φ3. After the signals V22 and V33 are set to the high level, the clock signal φ2 falls down at a point of time T2 before the clock signal φ3. Consequently, the second mask signal generator 2322 alters the state of the mask signal VM2 to the low level so that the signals V11 and V33 from the first and third mask circuits 2331 and 2333 receiving the mask signal VM2 are fixed to the low level. The signal V33 sampled after the signal V22 is hence masked.

Resultantly, outputted from the OR gate 234 is the signal V4 having a waveform similar to that of the signal V22. The signal V4 is sent to the decoder 24 such that transmission information is extracted therefrom.

In other words, when there exist received signals arrived thereat at the same time in the first embodiment, the received light signal assumed to be first sensed by the first to third mask signal generators 2321 to 2323 according to three clock signals φ1 to φ3 is fed as the signal V4 to the decoder 24. Namely, the other received light signals are masked. The mask release signal generator 235 sets, when a period of time φ2 lapses after the rising edge of the signal V4, the mask release signal V5 and keeps the state for a period of time τ3 (τ0>τ2+τ3). In response thereto, the JK flip-flop of the second mask signal generator 2322 is reset to change the state of the mask signal VM2 to the H level as shown in FIG. 6, thereby releasing the masking operation for the signals V11 and V33.

Figure 7:
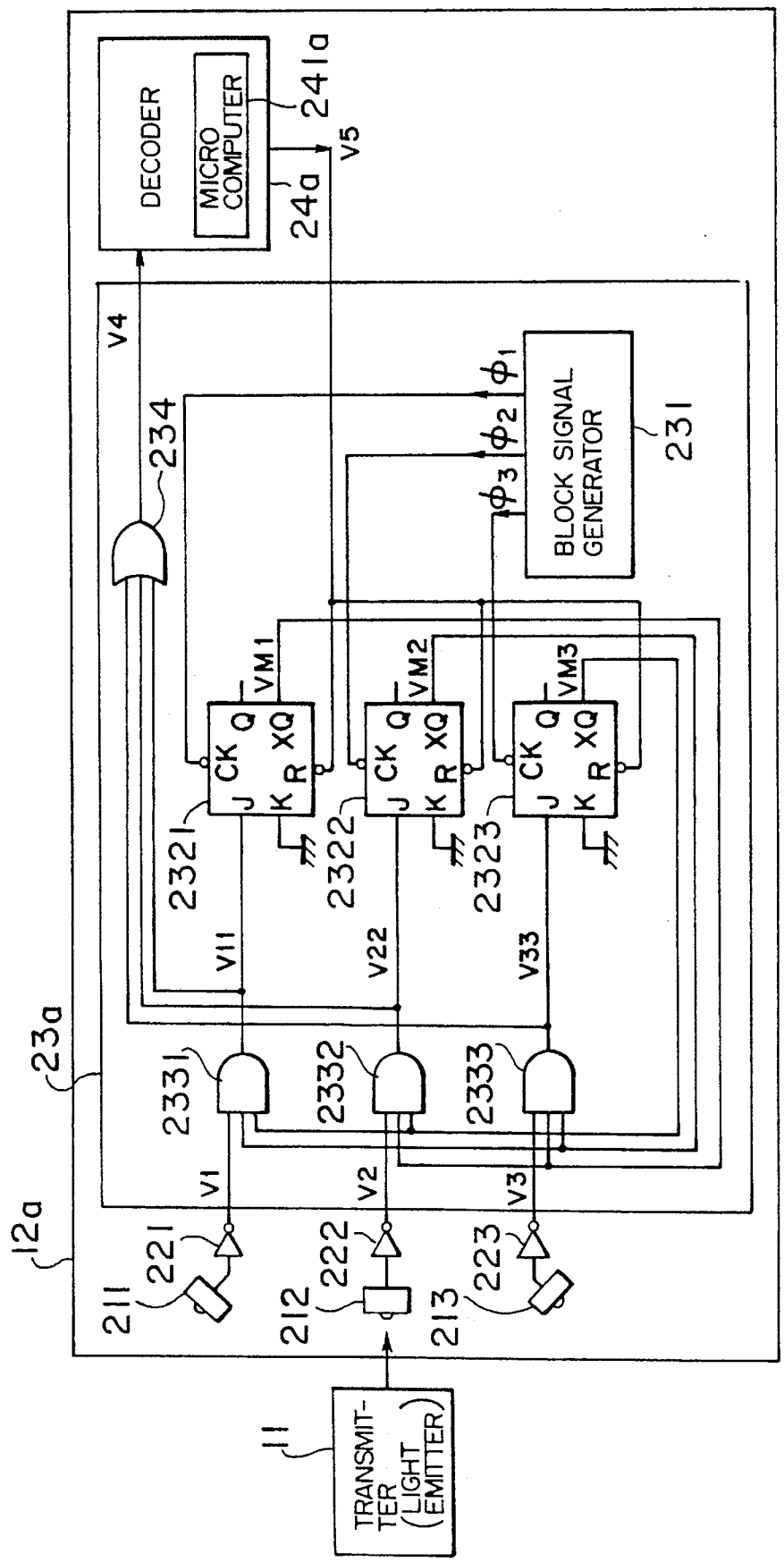
FIG. 7 is a block diagram showing the configuration of a second embodiment of an optical remote controller according to the present invention.

Next, description will be given of a second embodiment of the present invention by reference to the drawings. FIG. 7 shows in a block diagram the second embodiment of the optical remote controller according to the present invention. In this diagram, a reference numeral 241a denotes a micro computer and a numeral 24a designates a decoding circuit including the micro computer 241a. The mask release signal generator 235 is missing in a received light signal selector 23a. The other configurations of the selector 23a and a receiver 12a are the same as those of the first embodiment.

Operation of the embodiment will be now described. The micro computer 241a of the decoder 24a receives as an input thereto a signal V4 created from an OR gate 234 to encode transmission information contained in the signal V4 and to output a mask release signal V5 when a trailer field as a terminal point of a packet is detected (FIG. 4).

As a result, the JK flip-flop of each of the first to third mask signal generators 2321 to 2323 is reset to change the output signal to the high level, thereby releasing the masking for the received signal. Operations of the other constituent components are the same as those of the first embodiment.

As described above, according to the first and second embodiments, the received signal propagated through the shortest optical path and hence received at the earliest point of time is selected at reception of the first position of each packet. This makes it possible to receive an optical signal free of distortion in the waveform due to attenuation and reflection. The error in the pulse width of the signal is reduced and the ratio of successful decoding operations is improved, which elongates the communication distance. Moreover, since there is not employed the method in which a light receiving module is selected for communications on the basis of judgement of a communication error after reception of a packet, the present invention is applicable to communications of data not containing check data such as parity bits.

Figure 8A:
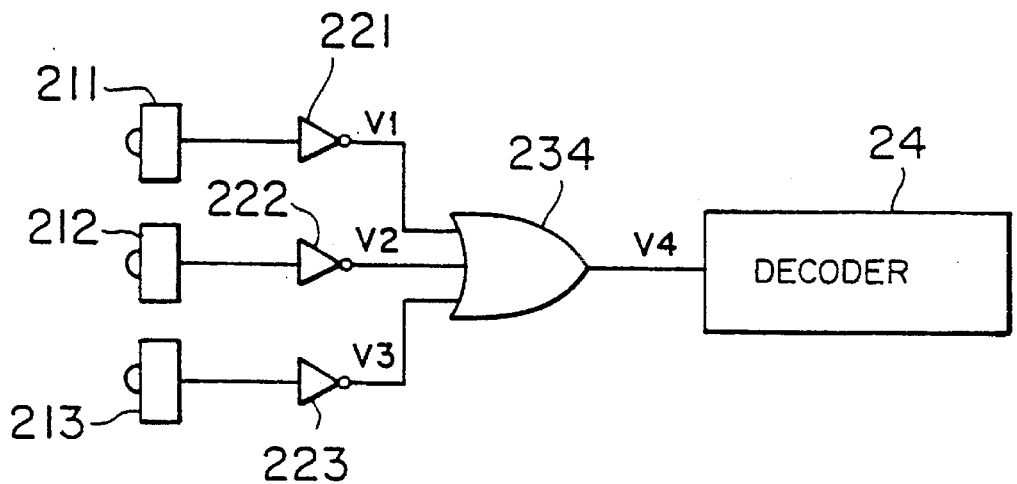
FIG. 8A is a logic circuit diagram for explaining an OR operation of signals from a plurality of light receiving modules.
Figure 8B:
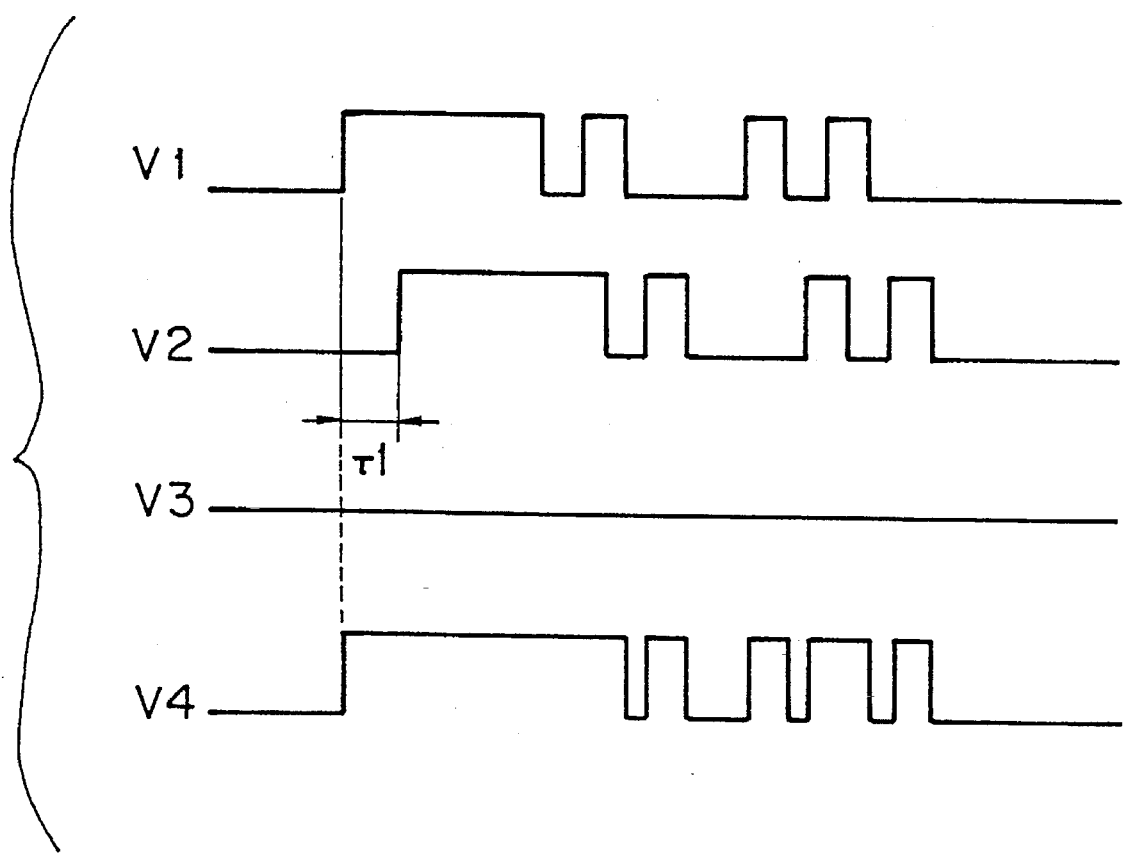
FIG. 8B is a signal timing chart for explaining the OR operation.

FIGS. 8A and 8B show operation of an OR logic for signals from a plurality of light receiving modules. Referring now to FIGS. 8A and 8B, description will be given of advantages resultant from selection of the received signal first sensed. Namely, according to the method of the present invention, only the first received optical signal is selected from the plural signals V1 to V3. Consequently, as shown in FIGS. 8A and 8B, when signals having a large difference between the optical path lengths thereof are ORed for reception, since the OR operation is conducted for the signals (V1+V2) in association with the delay time τ1, the waveform of the signal (V4) to be fed to the decoder 24 is maintained without destruction, which makes it possible to appropriately decode the signal.

As a result of the above characteristic, particularly, when the transmitter 11 is moved, it is possible to minimize the chance of communication errors due to usage of light receiving modules beyond the range to receive light emitted from the transmitter 11. As can be seen from the transmission signal Vs of FIG. 4, abbreviated codes can be used for the second and subsequent packets when repeatedly transmitting the same data, thereby reducing power consumed by the transmitter 11.

In addition, since the received signals V11 to V33 are sampled at points of time respectively synchronized with three clock signals having mutually different phases, even when there appear received signals sensed at the same time, the signals are not masked by each other.

Furthermore, according to the present invention, since the plural light receiving modules are fixedly arranged at positions radially along a circular line such that the light receiving central axes thereof have an angular difference of 60° therebetween, thereby obtaining an expanded light receiving range for the light receiving circuits to 180°. Moreover, the light receiving range of each module can be used to the maximum extent. Resultantly, there does not appear any dead angle.

In addition, for each light receiving module, there are disposed one waveform shaping gate, one received signal mask circuit, one mask signal generator, one clock signal, and one OR gate input terminal. Consequently, the light receiving range can be further expanded only by disposing additional light receiving modules each including the constituent elements without changing the basic structure of the receiver 12.

According to the first embodiment of the present invention, since the received signal selector 23 includes the mask release signal generator 235 therein, the decoder 24 can be implemented by a low-cost general-purpose integrated circuit dedicated for decoding operation. This lowers the production cost of the apparatus.

Figure 9A:
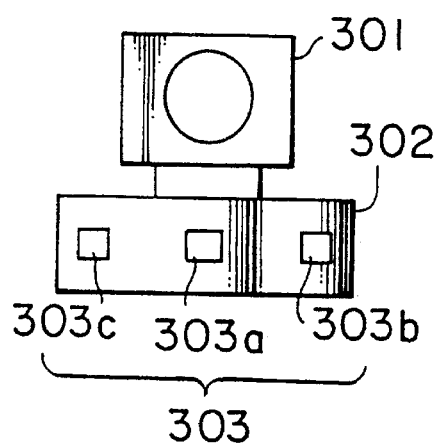
FIG. 9A is a front view showing a third embodiment of an optical remote controller according to the present invention.
Figure 9B:
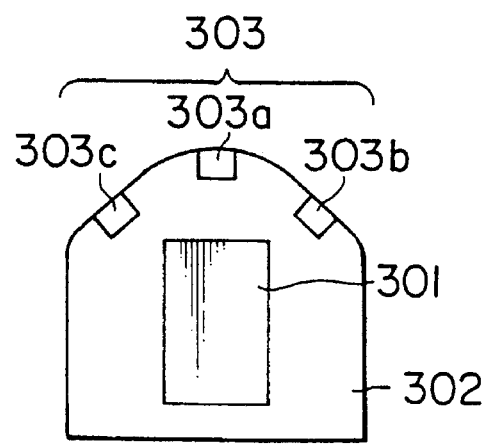
FIG. 9B is a plan view of the third embodiment.
Figure 9C:
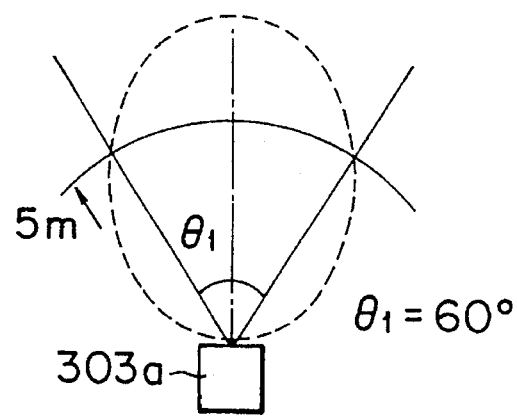
FIG. 9C is a diagram showing a light reception range of one light receiving module.
Figure 9D:
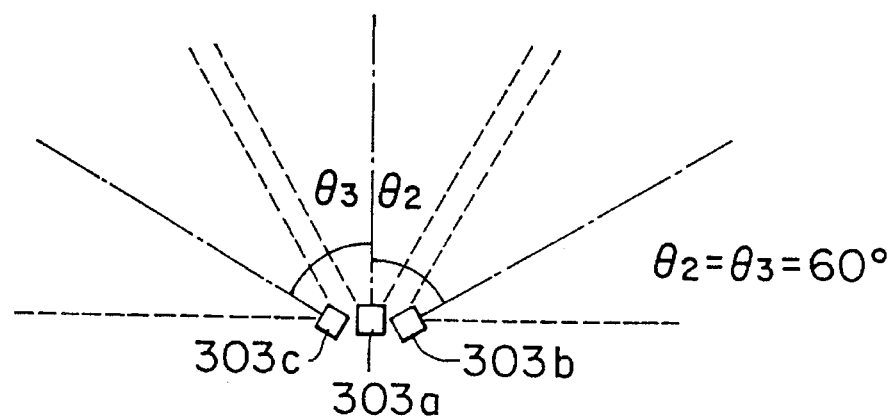
FIG. 9D is a diagram showing a light reception range of three light receiving modules.

Next, description will be given of an optical communication method and an optical remote controller in a third embodiment according to the present invention. FIGS. 9A and 9B respectively are a front view and a plan view of the optical remote controller in the third embodiment. FIGS. 9C and 9D are diagrams respectively showing light receiving ranges respectively of one light receiving module and three light receiving modules.

In FIG. 9A, a camera 301, which is rotatable in the vertical and horizontal directions, is attached on a fixed support plate 302. The support plate 302 horizontally and vertically drives the direction of the camera 301. The support plate 302 includes a front section in which a light receiving section 303 is arranged as shown in FIG. 9B. The section 303 includes three infrared ray receiving elements (to be simply referred to as light receiving modules herebelow) 303a, 300b, and 303c.

As can be seen from FIG. 9C, each light receiving module has a light receiving range of about 60° with a sense distance of five meters (m) therefrom. When the distance is less than five meters, the light receiving range is likely to be slightly expanded. The modules 303a, 303b, and 303c having the above characteristic are disposed on the support plate 302 with an angular difference of 60° therebetween as shown in FIG. 9D. This leads to the total light receiving range of 180° for these modules 303a, 303b, and 303c.

Figure 10:
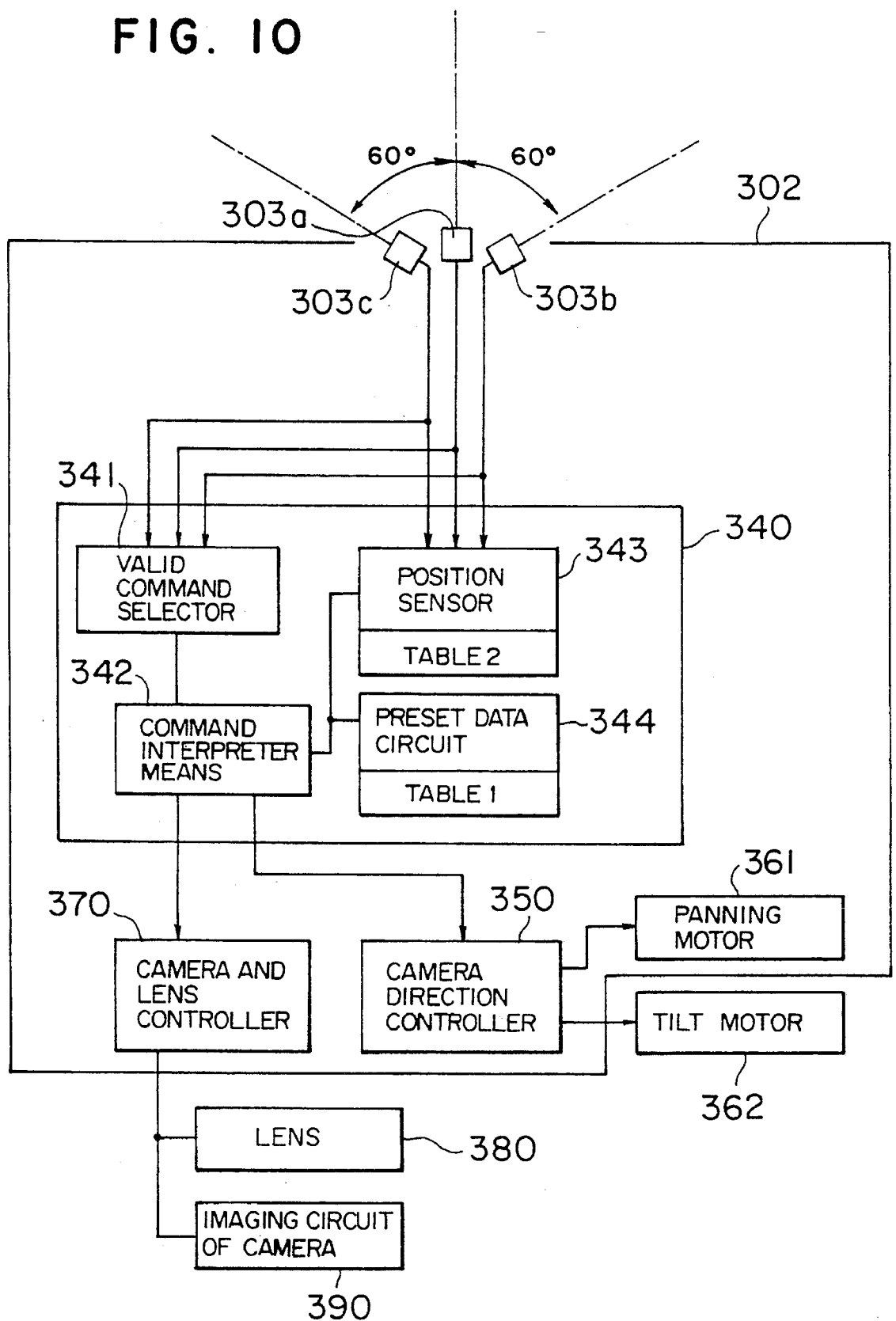
FIG. 10 is a block diagram showing a control system of the third embodiment.

FIG. 10 shows in a block diagram the control system of the optical remote controller in the third embodiment. In this diagram, the front section of the support plate 302 is the light receiving section 303 including the modules 303a, 303b, and 303c. There is disposed an optical remote control section 340 including a valid command selector 341, command interpreter means 342, a position sensor 343, and a preset data circuit 344.

There are further arranged a camera direction controller 350 to control the direction of the camera, a panning motor 361 to drive the horizontal angle of the camera, and a camera and lens controller 370 to conduct camera and lens control operations. These constituent components 350, 361, and 370 operate under control of the control section 340.

In the camera 301, there are disposed a tilt motor 362 to drive the vertical angle of the camera, lens 380 of the camera, and an imaging circuit 390 to shoot a picture.

Next, the valid command selector 341 receives optical remote control signals from the light receiving modules 303a, 303b, and 303c to select therefrom only one valid signal for use in the apparatus and then sends the selected signal to the command interpreter 342. Since the method of selecting the valid signal has already been described in detail in conjunction with the first and second embodiments, duplicated description thereof will be avoided.

The command interpreter 342 interprets general commands of the optical control signal by a central processing unit (CPU) thereof to resultantly control peripheral circuits. Output signals therefrom related to the camera control are sent to the camera direction controller 350 and the camera and lens controller 370.

TABLE 1

Preset Data Table

| Preset data No. | Preset camera direction | Shooting angle φH |
|---|---|---|
| 1 | Left/right:0, Up/down:0, | φH:60° |
| 2 | Left: 10°, Up: 5°, | φH:30° |
| 3 | Right: 10°, Down: 5°, | φH:45° |
| 4 | Right: 50°, Down: 10°, | φH:10° |
| 5 | Left: 60°, Up: 5°, | φH:15° |

TABLE 2

Position Sense Table

Figure 13:
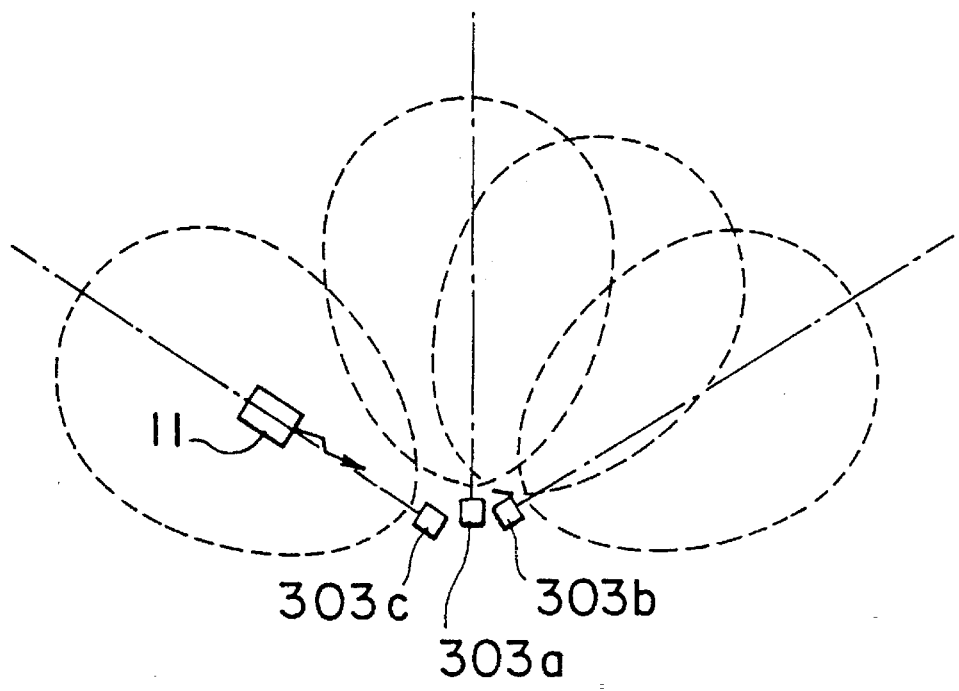
FIG. 13 is a diagram showing a relationship between the incident direction of signals from a signal transmitter and light sense ranges of light receiving modules.
Figure 15:
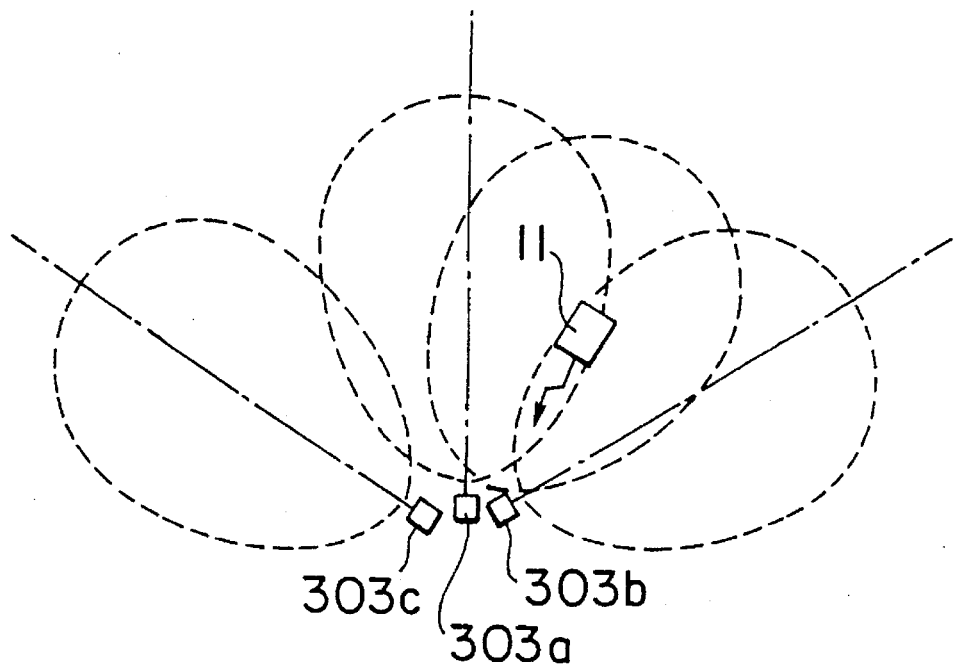
FIG. 15 is a diagram showing still another relationship between the incident direction of signals from a signal transmitter and light sense ranges of light receiving modules.
Figure 16:
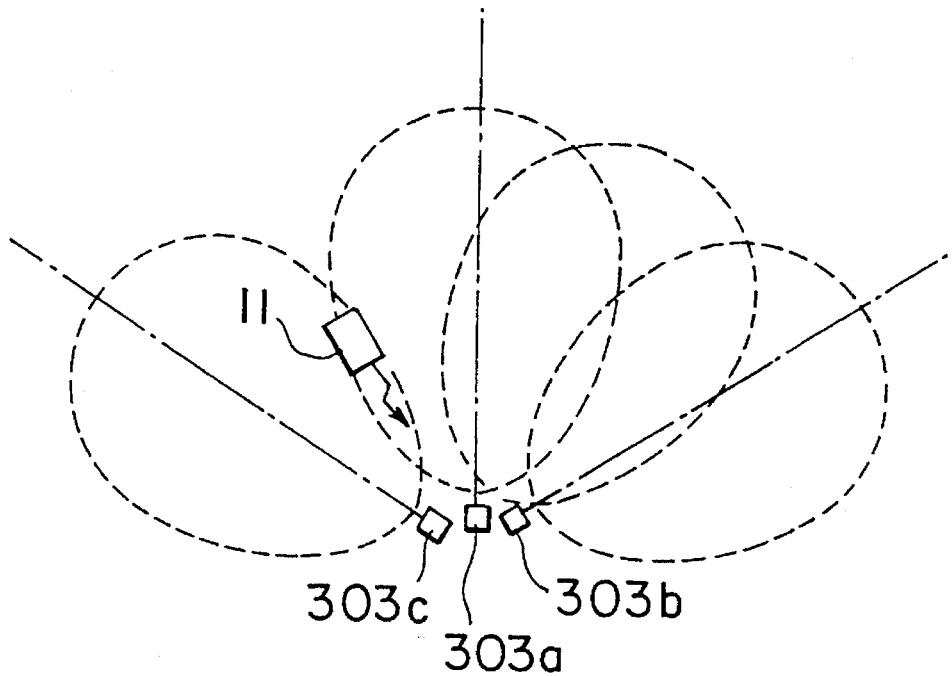
FIG. 16 is a diagram showing further another relationship between the incident direction of signals from a signal transmitter and light sense ranges of light receiving modules.

| Light receiving module signal | | | Arrival direction of transmission signal | Appropriate shooting angle (horizontal) |
|---|---|---|---|---|
| 303A | 303B | 303C | | |
| Present | Absent | Absent | Left/right 0° (FIG. 11) | 60° |
| Absent | Absent | Present | Left 60° (FIG. 13) | 60° |
| Absent | Present | Absent | Right 60° (FIG. 14) | 60° |
| Present | Present | Absent | Right 30° (FIG. 15) | 60° |
| Present | Absent | Present | Left 30° (FIG. 16) | 60° |

The position sensor 343 includes a storage area as shown in Table 2, namely, Position Sense Table in which combinations of output signals of the light receiving modules, directions of the transmitter (light emitting section) 11, and associated shooting angles of view are stored in advance. Under control of the command interpreter means 342, the position sensor 343 references this table according to the combination of the signals outputted respectively from the light receiving modules 303a, 303b, and 303c to determine the direction of the transmitter (light emitter) 11.

The preset data circuit 344 includes a storage area as shown in Table 1, namely, Preset Data Table. In this table, there are beforehand stored preset data including preset camera directions and shooting angles related thereto. Under control of the command interpreter means 342, the preset data circuit 344 references Table 1 according to a preset number contained in the command to output a camera moving direction and a shooting angle of view to the command interpreter means 342.

In addition, a signal outputted from the interpreter means 342 is fed to the camera direction controller 350 and the camera and lens controller 370. The camera direction controller 350 drives according to the output signal from the command interpreter means 342 the panning motor 361 (for movement in a horizontal direction) and the tilt motor 362 (for movement in a vertical direction) to horizontally and vertically control the shooting direction. The camera and lens controller 370 controls in response to the output signal from the command interpreter means 342 the shooting angle of view for the lens 380 and the shooting condition of the imaging circuit 390.

Description will now be given of operation of the optical remote controller configured as above in which the camera direction is controlled by a "move" command contained in the optical remote control signal.

Assume light modulated according to the contents of communication is transmitted from the transmitter (light emitter) 11 to the support plate 302. The transmitted signal has the contents described by reference to FIG. 4 in association with the first embodiment.

Assume that the transmitter 11 is at the position shown in FIG. 2. In FIG. 10, the light is earliest received by the light receiving module 303b. Through the signal processing steps described in detail in conjunction with the first embodiment, there is obtained a received light signal from the valid command selector 341. The signal is then delivered to the command interpreter means 342. Namely, the resultant received signal is an optical signal having a waveform free of deformation due to attenuation and reflection; moreover, the signal is attended with a reduced chance of errors in the pulse width. Consequently, a high ratio of successful decoding operations is obtained for these signals and hence the communication distance thereof is increased.

The command interpreter means 342 interprets a command of the received signal by a CPU thereof to reference the preset data circuit 344 according to a preset number contained in the command.

The preset data circuit 344 references Table 1, namely, Preset Data Table under control of the command interpreter circuit 342 to decide data indicating the camera moving direction and the shooting angle of view according to the preset number, thereby outputting the data to the command interpreter means 342.

The command interpreter means 342 then outputs the data of the camera moving direction and data of the shooting angle of view respectively to the camera direction controller 350 and the camera and lens controller 370. When the preset number contained in the command is, for example, "3", there are outputted control data items including the camera moving direction as "10° to the right, 5° downward" and the angle of view (zooming angle) as "45°".

As a result, the camera direction controller 350 drives the panning motor 361 (horizontal direction) and the tilt motor 362 (vertical direction) to horizontally and vertically control the shooting direction of the camera. The camera and lens controller 370 controls the shooting angle of view for the lens 380 and the shooting condition for the imaging circuit 390.

Figure 11:
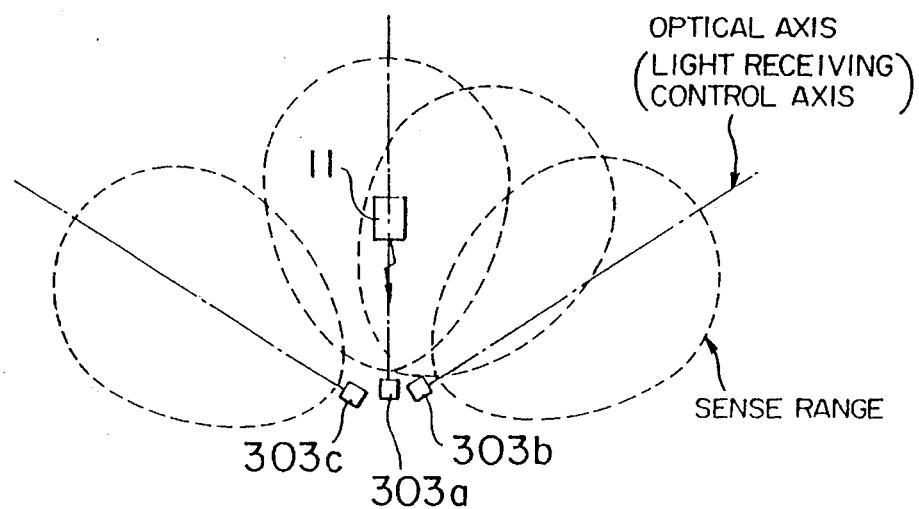
FIG. 11 is a diagram showing relationships between incident directions of signals from a signal transmitter and signal sense regions of light receiving modules.

Next, description will be given in detail of operation of the fourth embodiment according to the present invention in which the camera is oriented to the direction to receive transmitted signals. FIG. 11 shows relationships between incident directions of signals from the transmitter 11 and light sense ranges respectively of the light receiving modules 303a, 303b, and 303c. As can be seen from FIG. 11, when the transmitter 11 is at a position along the central axis of the module 303a, the output signal V1 (303A) is attained only from the module 303a.

As indicated by dotted lines, the light sense ranges are slightly overlapped with each other. Consequently, when the transmitter is at a position along a direction between the central axes respectively of two light receiving modules, for example, the modules 303a and 303b, two output signals V1 (303A) and V2 (303B) are obtained respectively therefrom.

In this manner, there are possibly formed five combinations of the output signals from the light receiving modules according to the incident directions of the transmitted signals. Reference is to be made to FIGS. 11 and 13 to 16 and Table 2 for details. Consequently, the position sensor 343 can determine the direction of the transmitter 11 by examining the combination of the output signals from the modules 303a, 303b, and 303c. Table 2 contains information items related to the combinations.

Figure 12:
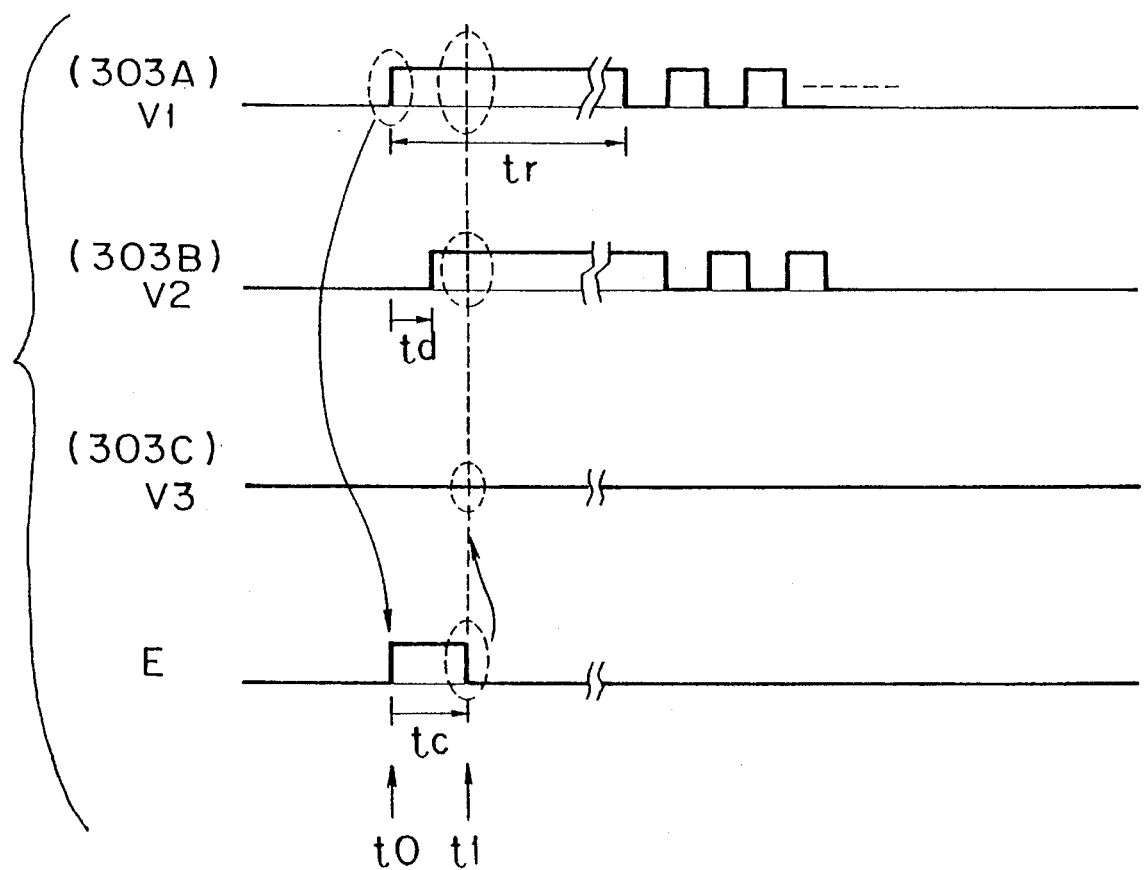
FIG. 12 is a signal timing chart showing signals produced from the light receiving modules and confirmation timing thereof in a fourth embodiment according to the present invention.

FIG. 12 shows output signals from the modules 303a, 303b, and 303c of the fourth embodiment and confirmation timing points thereof. Assume that the transmitter is at an intermediate position between the light sense ranges respectively of the modules 303a and 303b. For the reasons described in conjunction with the first embodiment, the transmitted signals arrive at the modules 303a, 303b, and 303c at points of time slightly different from each other.

In the example of FIG. 12, the output signal V1 (303A) rises at time t0, whereas the output signal V2 (303B) rises when a period of time td lapses thereafter. In this case, the position sensor 343 generates a signal E from the output signal V1 (303A) first obtained. The signal E has a pulse width tc, which is, for example, about 10 microseconds (μs). At time t1 of termination of the pulse of the signal E, the presence or absence of each of the output signals V1 (303A), V2 (303B), and V3 (303C) is confirmed, thereby suppressing influence of discrepancy in the arrival time between the received signals.

The pulse width tc of signal E is decided on the basis of the maximum time difference determined according to distance between the transmitter and each of the light receiving modules 300a, 303b, and 303c arranged on the support plate 302. On the other hand, the pulse width tc is set to be sufficiently narrower than the first pulse width (tr) of the signal sent from the transmitter 11.

In the Position Sense Table, namely, Table 2 of the position sensor 343, there are in advance stored data items (direction information) representing a correspondence between the states of output signals from the modules 300a, 303b, and 303c and the driving directions of the camera 301. Using the stored data items, the sensor 343 selects and outputs a signal denoting the camera driving direction according to the output signals from the modules 300a, 303b, and 303c.

Description will now be given of operation of the fourth embodiment constructed as above in which the camera is directed to the transmitter 11. Assume that the camera 301 is controlled in a manner different from that used for the "move" command to horizontally and vertically move the camera 301 in the third embodiment. Namely, when there is employed a command to direct the camera 301 to the transmitter 11 or when the "move" command is missing, the command interpreter circuit 342 controls the camera 301 to face the transmitter 11 according to the output signal from the position sensor 343.

Assume that light modulated according to the transmission contents is emitted from the transmitter 11 to the support plate 302. The contents of the transmitted signal are similar to those of the first embodiment described by reference to FIG. 4.

Figure 14:
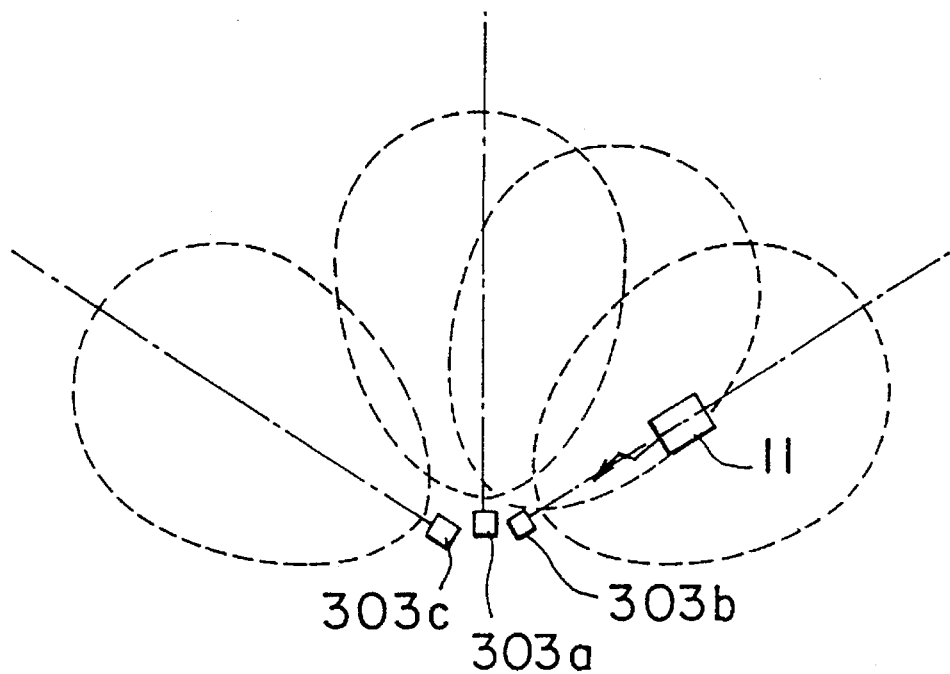
FIG. 14 is a diagram showing another relationship between the incident direction of signals from a signal transmitter and light sense ranges of light receiving modules.

When the transmitter 11 is at the position shown by way of example in FIG. 2 or 14, the light receiving module 303b receives the light at the earliest point of time in the configuration of FIG. 10. There is obtained, through the signal processing steps described in detail for the first embodiment, the first received signal from the valid command selector 341. This signal is an optical signal having a waveform not distorted by attenuation and reflection, which minimizes the pulse width error. For the signal, there is attained a high ratio of successful decoding operations, and hence the communication distance is increased. The obtained signal is then transmitted to the command interpreter means 342.

The interpreter 342 interprets a command of the signal by a CPU thereof to reference the position sensor 343 according to a condition that the "move" command is missing or according to a sub-command contained in the command to direct the camera 301 to the transmitter 11.

The position sensor 343 confirms presence or absence of signal reception in the three light receiving modules according to the signal timing chart of FIG. 12 and then references the Position Sense Table (Table 2) to decide the direction in which the transmitter 11 exists, thereby producing and outputting signals indicating the driving direction and the appropriate shooting angle of view of the camera 301.

Description will now be given of an advantageous effect resultant from addition of shooting angle information. In the fourth embodiment, three light receiving modules 303a, 303b, and 303c are disposed with an angular difference of 60° between the central axes thereof. Consequently, there are provided five sense directions and the sense precision is expressed as about 30° as described above. In this situation, when a zooming control operation of the camera 301 is conducted to vertically and horizontally drive the camera 301 with a broad shooting angle of view θ1=60° (FIG. 9C), the subject bearing the transmitter 11 (for example, the camera bearer operating the transmitter 11) is shot by the camera 301.

However, since the sense precision is about 30° as above, when the camera 301 is vertically and horizontally driven with a narrow shooting angle of view, for example, θ1=10° (FIG. 9C), although the camera 301 is driven toward the direction of the subject having the transmitter 11, it is not guaranteed that the subject is shot by the camera 301.

To cope with this problem, predetermined information of shooting angle of view is beforehand stored in the position sense circuit 343 together with information of directions (FIGS. 11 and 13 to 16) of the transmitter 11 as shown in Positional Sense Table (Table 2).

The information of shooting angle of view is appropriately set in association with direction sense precision and is set to about 60° in the fourth embodiment. In a case of light receiving modules having sense ranges different from those of the fourth embodiment, it is to be appreciated that the number of light receiving modules to be arranged and the information of shooting angle of view are again set to optimal values difference from those of the fourth embodiment.

In accordance with the above-discussed system, the command interpreter means 342 achieves a drive control operation according to the direction information stored in the position sensor 343 to direct the camera 301 to the transmitter 11 and further sets the shooting angle of view to, for example, about 60° according to the information of shooting angle of view.

On receiving a signal sent from the transmitter 11, the command interpreter means 342 directs the camera 301 to the transmitter 11 and sets the shooting angle of view to an appropriate value on the basis of a signal outputted from the position sensor 343. Consequently, the subject (the operator of the transmitter 11) can easily direct the camera 301 to the subject only by transmitting a light signal from the transmitter 11.

Figure 17A:
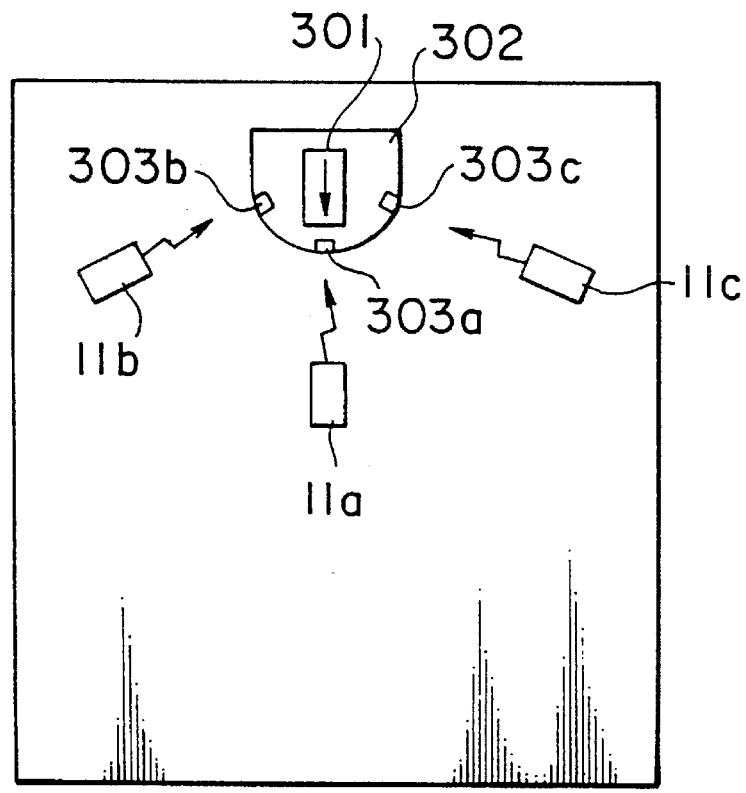
FIG. 17A is a diagram showing a utilization situation of the optical remote controller including a plurality of signal transmitters according to the fourth embodiment of the present invention.
Figure 17B:
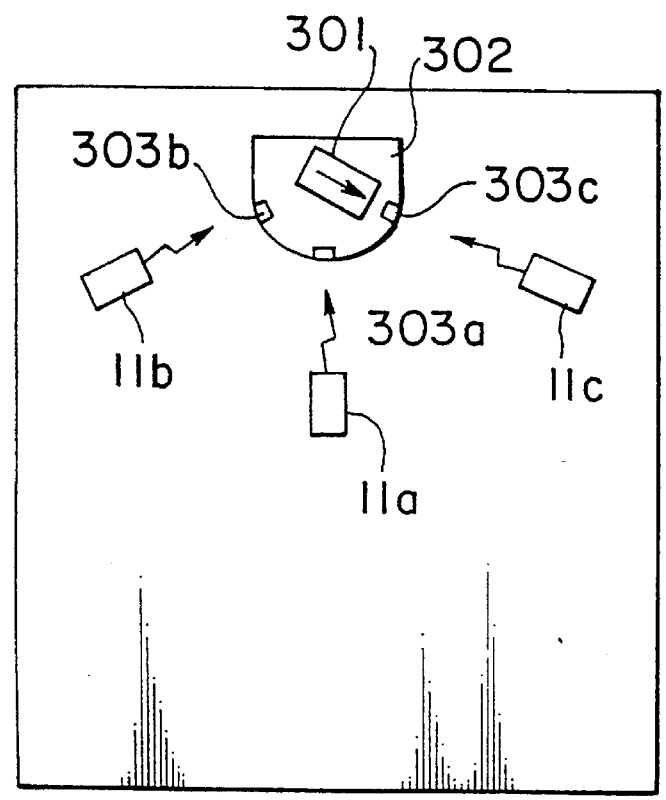
FIG. 17B is a diagram showing another utilization situation of the optical remote controller including a plurality of signal transmitters according to the fourth embodiment of the present invention.
Figure 18:
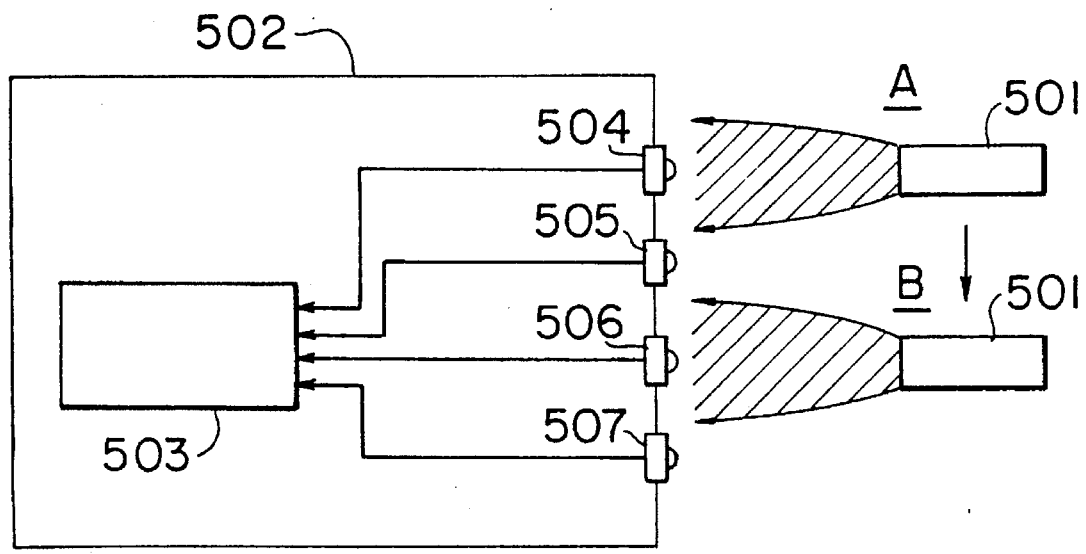
FIG. 18 is a block diagram showing a first conventional example of the optical remote controller.
Figure 19:
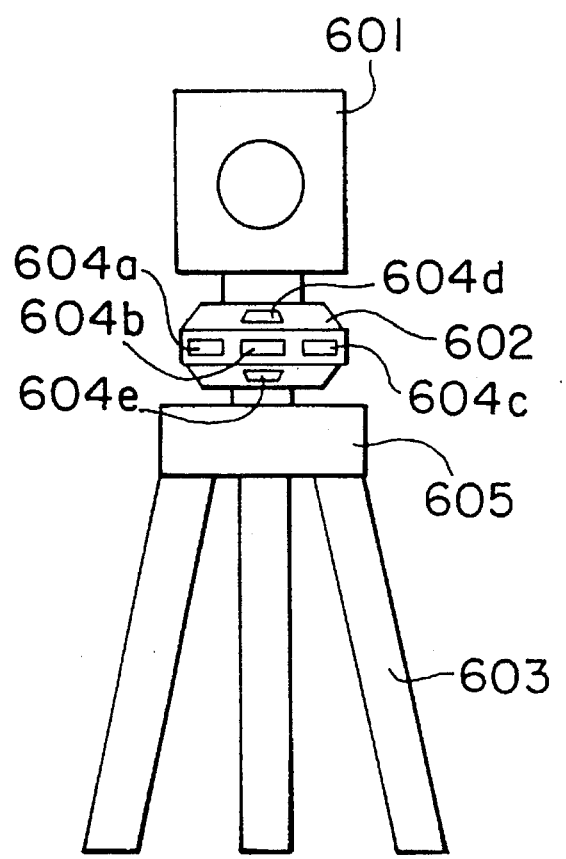
FIG. 19 is a front view showing a second conventional example of the optical remote controller.
Figure 20:
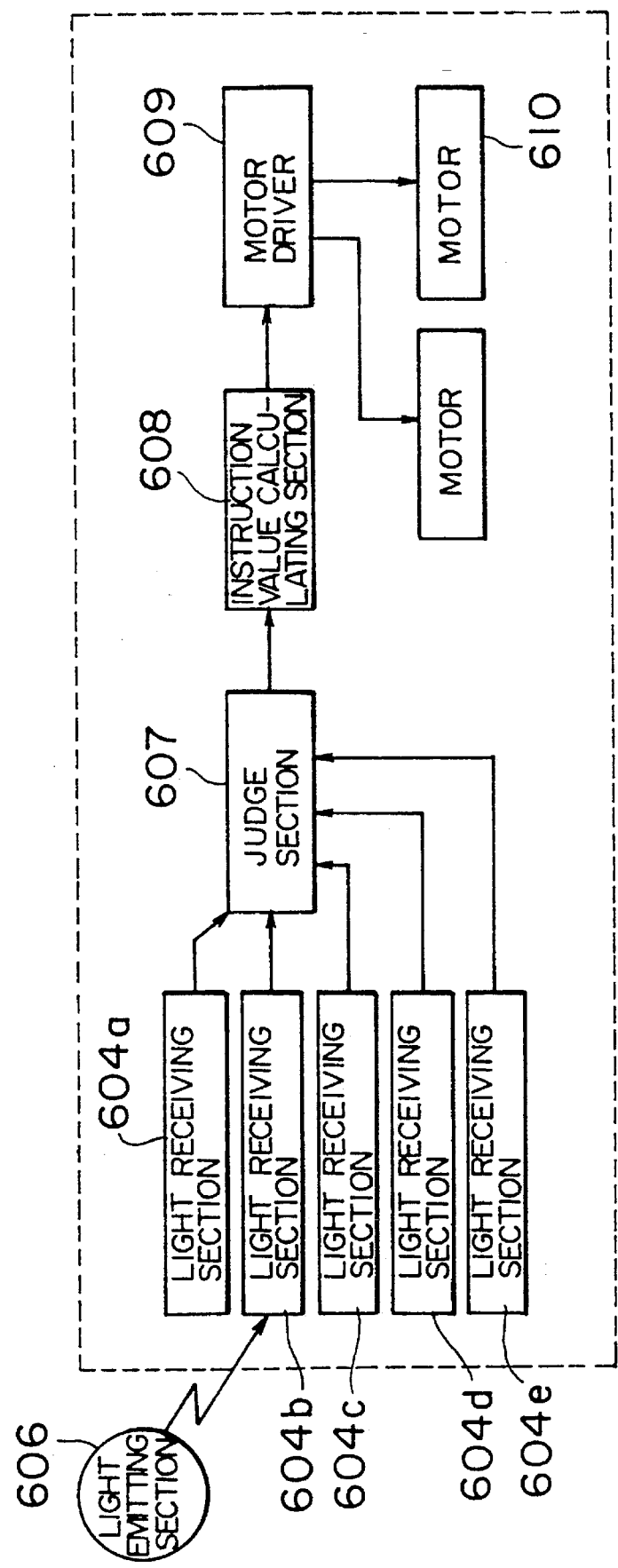
FIG. 20 is a block diagram showing the control section of the second conventional example.

In the description of the embodiment, there is used only one transmitter 11. However, when there are utilized a plurality of transmitters 11, the advantageous aspect of the present invention is much more enhanced. Assume that three transmitters 11a, 11b, and 11c are disposed. FIGS. 17A and 17B show usages of a plurality of transmitters with the optical remote controller in the fourth embodiment according to the present invention.

The optical remote controller of the embodiment is arranged on the support plate 302 on which three light receiving modules 303a, 303b, and 303c and hence can receive signals from all transmitters 11a, 11b, and 11c regardless of the direction of the camera 301 as shown in FIGS. 17A and 17B.

There is adopted a method in which the first obtained light signal propagated through the shortest optical path is selected at reception of the first position of each packet. The configuration in which a plurality of transmitters are used consequently and efficiently enhances the advantageous feature of the present invention. Namely, there can be received a light signal having a waveform free of distortion due to attenuation and reflection, thereby leading to reduction in the pulse width error of the signal. This improves the ratio of successful decoding operations and increases the communication distance.

When compared with the case where only one light receiving module is used, the light receiving range can be expanded. Even in a case where the light emitting section is moved, there can be in any situation selected a received light signal from one of the light receiving modules which develops the optimal output, and hence it is possible to minimize transmission errors and reception failures due to the movement of the light emitting section.

In addition, the optical remote controller includes a clock signal generator to generate a plurality of clock signals having mutually different phases and invalidation signal generating means to sense a received light signal in synchronism with the clock signals. In consequence, even when two or more light receiving sections output received light signals, it is possible to avoid a disadvantageous event in which the plural invalidation signal generating means simultaneously sense the received light signals to mutually invalidate the associated received light signals and hence the received light signal selector cannot output any received light signal.

When there is disposed an invalidation period measuring section which outputs an invalidation release signal to release the invalidation signal for the received signal selection, it is possible to use a low-priced general-purpose integrated circuit dedicated for the encoding, thereby lowering the production cost of the apparatus.

Moreover, when a plurality of light receiving sections are radially arranged with the light receiving central axes separated from each other by an angle of the light receiving range thereof, the light receiving range of each light receiving section can be utilized to the maximum extent and hence there is attained the total light receiving range without an dead angle.

Particularly, in a television conference system (an electronic conference system) increasingly being developed today, when there is disposed a mobile picture camera for the television conference system, the attendants of the conference at broadly distributed positions can operate the camera at their positions or while moving to another position through infrared ray communications.

In the television conference system, since the operation to control the camera direction is accomplished while viewing the screen image short by the camera, it is not easy to set the subject to a position in the shooting range of the camera. However, when the subject is within the shooting range, the subject can be easily moved to a central position of the screen image. Consequently, operability is remarkably improved by the optical remote controller according to the present invention.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

We claim:

1. An optical communication method comprising:

(a) generating a plurality of clock signals having mutually different phases;

(b) receiving light emitted from a light source by using a plurality of light receiving sections and converting the light received by said plurality of light receiving sections into received signals;

(c) determining whether or not each of the received signals is present when each clock pulse included in a respective one of the clock signals is generated;

(d) generating an invalidation signal when a received light signal is determined to be present in step (c);

(e) preventing, when the invalidation signal is present, other received signals from being used to generate said invalidation signal; and (f) decoding the received signal for which the invalidation signal is generated.

2. An optical communication method according to claim 1, further including the steps of:

measuring lapse of a predetermined period of time according to the received signal for which the invalidation signal is generated;

generating an invalidation release signal when said lapse of said predetermined period of time is measured; and releasing the invalidation signal in response to the invalidation release signal.

3. An optical communication method according to claim 1, wherein said step (f) includes sensing termination of communication information contained in the received signal and generating in invalidation release signal when said termination of said communication information is sensed, and said method further includes the step of releasing the invalidation signal in response to the invalidation release signal.

4. An optical communication method comprising:

(a) receiving light emitted from a light source by using a plurality of light receiving sections radially arranged respectively at fixed positions relative to said light source and converting the light received by said plurality of light receiving sections into a plurality of received signals;

(b) memorizing (i) a plurality of first information items each representing a light emission direction of the light source and corresponding control information of a shooting angle of view of a camera and (ii) a plurality of second information items corresponding to said first information items and each representing a number of, and positions of, the one or more light receiving sections which received the light when the light source is oriented to have the light emission direction of the corresponding first information item; and (c) searching the second information items memorized in step (b) on the basis of information indicating the one or more light receiving sections which have received the light emitted from the light source and determining, when a matching condition is obtained between said information indicating the one or more light receiving sections which have received the light emitted from the light source and one of said second information items, the one of the first information items corresponding to the one of said second information items to obtain the light emission direction of said light source from said one of said first information items.

5. An optical remote controller, comprising:

a light source for emitting light modulated on the basis of a communication signal;

clock signal generating means for generating a plurality of clock signals having mutually different phases;

a plurality of received light processing means for receiving and converting the light emitted from the light source into respective received signals and outputting said respective received signals;

a plurality of invalidation signal generating means for determining whether or not one of the received signals is output from a respective one of the received light processing means when each clock pulse included in a respective one of the clock signals is generated by the clock signal generating means and generating and outputting an invalidation signal for a predetermined time period when a determination is made that one of said received signals is being output;

a plurality of received signal invalidation means for preventing, when a said invalidation signal is being output from a respective one of said invalidation signal generating means, other received signals from being transmitted to the respective one of the invalidation signal generating means; and decoding means for decoding the one of the received signals for which the invalidation signal is generated to obtain solid communication signal.

6. An optical remote controller according to claim 5, further including:

invalidation period measuring means for measuring lapse of a second predetermined period of time according to the one of the received signals for which the invalidation signal is generated and generating an invalidation release signal when said lapse of said second predetermined period of time is measured; and invalidation signal release means for releasing the invalidation signal in response to the invalidation release signal.

7. An optical remote controller according to claim 5, wherein the decoding means includes communication termination sense means for sensing a termination of communication information contained in the one of the received signals and generating an invalidation release signal in response to sensing of said termination of said communication information, and the controller further includes invalidation signal release means for releasing the invalidation signal in response to the invalidation release signal.

8. An optical remote controller, comprising:

a light source for emitting light modulated on the basis of a communication signal;

a plurality of received light processing means radially arranged respectively at fixed positions relative to said light source and including a plurality of light receiving sections for receiving the light emitted from the light source and means for converting the light received by said plurality of light receiving sections into a plurality of received signals and outputting said received signals;

memorizing means for memorizing (a) a plurality of first information items each representing a light emission direction of the light source and corresponding control information of a shooting angle of view of the camera and (b) a plurality of second information items corresponding to said first information items and each representing a number of, and positions of, the one or more light receiving sections which receive the light when said light source is oriented to have the light emission direction of the corresponding first information item; and position determining means for searching the second information items memorized in the memorizing means on the basis of information indicating the one or more light receiving sections which have received the light emitted by said light source and determining when a matching condition is obtained between said information indicating the one or more light receiving sections which have received the light emitted by said light source and one of said second information items, the one of the first information items corresponding to the one of said second information items to obtain the light emission direction from said one of said first information items.

9. An optical remote controller, comprising:

a light source for emitting light modulated on the basis of a communication signal;

a camera for shooting a desired picture at a desired angle of view in a desired direction;

a fixed section, said camera being rotatably supported by said fixed section so as to be rotatable in a horizontal or vertical direction, said fixed section including a plurality of light receiving sections for receiving the light emitted from the light source and a plurality of received light processing means for converting the light received by said plurality of light receiving section into respective received signals and outputting said respective received signals;

clock signal generating means for generating a plurality of clock signals having mutually different phases;

a plurality of invalidation signal generating means respectively associated with said plurality of received light processing means and said plurality of clock signals and each for determining whether or not one of the received signals is output from a respective one of the received light processing means when each clock pulse included in a respective one of the clock signals is generated by the clock signal generating means and generating and outputting an invalidation signal for a predetermined time period when a determination is made that one of said received signals is being output;

a plurality of received signal invalidation means for preventing, when a said invalidation signal is being output from an associated one of said invalidation signal generating means, other received signals from being transmitted to the associated one of the invalidation signal generating means;

decoding means for decoding the one of the received signals for which the invalidation signal is generated to obtain an output in accordance with said communication signal; and camera direction control means for driving the camera direction to a desired direction according to said output from the decoding means.

10. An optical remote controller according to claim 9, wherein the number of the light receiving means is three, and the light receiving means are radially arranged relative to said light source with about a 60° angle between adjacent light receiving axes.

11. An optical remote controller according to claim 9, further including:

invalidation period measuring means for measuring lapse of a second predetermined period of time according to the received signal for which the invalidation signal is generated and generating an invalidation release signal in response to measurement of said lapse of said second predetermined period of time; and invalidation signal release means for releasing the invalidation signal in response to the invalidation release signal.

12. An optical remote controller according to claim 9, wherein the decoding means includes communication termination sense means for sensing a termination of communication information contained in the received signal and generating in invalidation release signal in response to sensing of said termination of said communication information, and the controller further includes invalidation signal release means for releasing the invalidation signal in response to the invalidation release signal.

13. An optical remote controller, comprising:

a light source for emitting light modulated on the basis of a communication signal;

a camera for shooting a desired picture at a desired angle of view in a desired direction;

a fixed section, said camera being rotatably supported by said fixed section so as to be rotatable in a horizontal or vertical direction, said fixed section including a plurality of light receiving sections for receiving the light emitted frown the light source and a plurality of received light processing means for converting the light received by said plurality of light receiving sections into respective received signals and outputting said respective received signals;

position memorizing means for memorizing (a) a plurality of first information items each representing a light emission direction of the light source and corresponding control information of a shooting angle of view of the camera and (b) a plurality of second information items corresponding to said first information items and each representing a number of, and positions of, the one or more light receiving sections which receive the light when said light source is oriented to have the light emission direction of the corresponding first information item;

position determining means for searching the second information items memorized in the position memorizing means on the basis of information indicating the one or more light receiving sections which have received the light emitted by said light source and determining, when a matching condition is obtained between said information indicating the one or more light receiving sections which have received the light emitted by said light source and one of said second information items, the one of the first information items corresponding to the one of said second information items to obtain the light emission direction from said one of said first information items; and camera control means for driving the shooting angle of view of the camera according to the control information included in said one of said first information items determined by the position determining means.

14. An optical remote controller comprising:

a light source for emitting light modulated on the basis of a communication signal;

a camera for shooting a desired picture at a desired angle of view in a desired direction;

a fixed section, said camera being rotatably supported by said fixed section so as to be rotatable in a horizontal or vertical direction, said fixed section including a plurality of light receiving sections for receiving the light emitted from said light source and a plurality of received light processing means for converting the light received by said plurality of light receiving sections into respective received signals and outputting said respective received signals;

clock signal generating means for generating a plurality of clock signals having mutually different phases;

a plurality of invalidation signal generating means respectively associated with said plurality of received light processing means and said plurality of clock signals and each for determining whether or not one of the received signals is output from a respective one of the received light processing means when each clock pulse included in a respective one of the clock signals is generated by the clock signal generating means and generating and outputting an invalidation signal for a predetermined time period when a determination is made that one of said received signals is being output;

a plurality of received signal invalidation means respectively associated with said plurality of invalidation signal generating means and each for preventing, when a said invalidation signal is being output from an associated one of said invalidation signal generating means, other received signals from being transmitted to the associated one of the invalidation signal generating means;

decoding means for decoding the one of the received signals for which the invalidation signal is generated to obtain an output in accordance with the communication signal;

memorizing means for memorizing (a) a plurality of first information items each representing a light emission direction of the light source and corresponding control information of a shooting angle of view of the camera and (b) a plurality of second information items corresponding to said first information items and each representing a number of, and positions of, the one or more light receiving sections which receive the light when said light source is oriented to have the light emission direction of the corresponding first information item;

position determining means for searching the second information items memorized in the position memorizing means on the basis of information indicating the one or more light receiving sections which have received the light emitted by said light source and determining, when a matching condition is obtained between said information indicating the one or more light receiving sections which have received the light emitted by said light source and one of said second information items, the one of the first information items corresponding to the one of said second information items to determine the light emission direction from said one of said first information items; and camera control means for (i) horizontally or vertically driving the direction of the camera according to said output from the decoder means in a case where the communication signal includes a first command for controlling the direction of the camera, (ii) horizontally or vertically driving the direction of the camera to the light emission direction determined by said position determining means and (iii) controlling the shooting angle of view of the camera according to the control information of the shooting angle of view of the camera included in said one of said first information items in a case where the communication signal does not include the first command and in a case where the communication signal includes a second command for directing the camera to the light emission direction determined by said position determining means.

15. An optical remote controller according to claim 14, wherein the number of the light receiving means is three, and the light receiving means are radially arranged with about a 60° angle between adjacent light receiving axes of the light receiving means.

16. An optical remote controller according to claim 14, further including:

invalidation period measuring means for measuring lapse of a second predetermined period of time according to the received signal for which the invalidation signal is generated and generating an invalidation release signal in response to measurement of said lapse of said second predetermined period of time; and invalidation signal release means for releasing the invalidation signal in response to the invalidation release signal.

17. An optical remote controller according to claim 14, wherein the decoding means includes communication termination sense means for sensing a termination of communication information contained in the received signal and generating an invalidation release signal in response to sensing of said termination of said communication information, and the controller further includes invalidation signal release means for releasing the invalidation signal in response to the invalidation release signal.

* * * * *